United States Patent
Lee et al.

(10) Patent No.: US 11,071,153 B2
(45) Date of Patent: Jul. 20, 2021

(54) HOME APPLIANCE FOR INFORMATION REGISTRATION AND METHOD FOR REGISTERING INFORMATION OF HOME APPLIANCE

(71) Applicant: LG Electronics Inc., Seoul (KR)

(72) Inventors: Yongjae Lee, Seoul (KR); Hyunsung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 12 days.

(21) Appl. No.: 16/477,563

(22) PCT Filed: Jan. 12, 2018

(86) PCT No.: PCT/KR2018/000592
§ 371 (c)(1),
(2) Date: Jul. 12, 2019

(87) PCT Pub. No.: WO2018/131920
PCT Pub. Date: Jul. 19, 2018

(65) Prior Publication Data
US 2020/0127866 A1    Apr. 23, 2020

(30) Foreign Application Priority Data

Jan. 13, 2017 (KR) .................. 10-2017-0006027
Nov. 20, 2017 (KR) .................. 10-2017-0154717

(51) Int. Cl.
*H04W 76/11* (2018.01)
*A47L 9/28* (2006.01)
(Continued)

(52) U.S. Cl.
CPC ........... *H04W 76/11* (2018.02); *A47L 9/2894* (2013.01); *G06F 3/002* (2013.01); *G06K 7/1417* (2013.01);
(Continued)

(58) Field of Classification Search
CPC . H04W 4/008; H04W 76/023; H04W 12/047; H04W 12/77; H04W 76/11;
(Continued)

(56) References Cited

U.S. PATENT DOCUMENTS 10,828,783 B2 * 11/2020 Hillen ................ G06K 7/10722
2008/0250122 A1   10/2008 Zsigmond et al.
(Continued)

FOREIGN PATENT DOCUMENTS

CN    101141336 A    3/2008
CN    102684961 A    9/2012
(Continued)

*Primary Examiner* — Gregory G Todd
(74) *Attorney, Agent, or Firm* — Dentons US LLP

(57) ABSTRACT

A home appliance for information registration includes a body, a wireless communication unit connected to a wireless router using a wireless communication method and configured to transmit information, a camera attached to the body and configured to detect registration auxiliary information generated by a mobile terminal, and a controller configured to perform control to select the wireless router based on information acquired through the registration auxiliary information and to transmit device registration information including identification information thereof to a server through the selected wireless router.

19 Claims, 20 Drawing Sheets

(51) Int. Cl.

| | |
|---|---|
| *G06K 7/14* | (2006.01) |
| *H04L 12/28* | (2006.01) |
| *H04L 12/24* | (2006.01) |
| *H04W 12/77* | (2021.01) |
| *G06F 3/00* | (2006.01) |
| *H04W 12/047* | (2021.01) |
| *H04N 5/232* | (2006.01) |
| *G16Y 40/30* | (2020.01) |
| *G16Y 30/00* | (2020.01) |
| *A47L 9/00* | (2006.01) |
| *G05D 1/00* | (2006.01) |

(52) U.S. Cl.
CPC ...... *H04L 12/2809* (2013.01); *H04L 41/0806* (2013.01); *H04W 12/047* (2021.01); *H04W 12/77* (2021.01); *A47L 9/009* (2013.01); *A47L 9/2826* (2013.01); *A47L 9/2852* (2013.01); *A47L 2201/04* (2013.01); *G05D 1/0022* (2013.01); *G05D 2201/0203* (2013.01); *G16Y 30/00* (2020.01); *G16Y 40/30* (2020.01); *H04L 2012/285* (2013.01); *H04L 2012/2841* (2013.01); *H04N 5/23299* (2018.08)

(58) Field of Classification Search
CPC ............. H04L 41/0806; H04L 41/0846; H04L 12/2809; A47L 9/2894; A47L 2201/04; G06F 3/002; G06K 7/1417
See application file for complete search history.

(56) References Cited

U.S. PATENT DOCUMENTS

| | | | | |
|---|---|---|---|---|
| 2014/0317242 | A1* | 10/2014 | Koo | H04W 76/14 |
| | | | | 709/219 |
| 2015/0358364 | A1* | 12/2015 | Lee | H04L 65/1069 |
| | | | | 709/219 |
| 2016/0300354 | A1* | 10/2016 | Fetzer | G01B 11/14 |
| 2016/0308980 | A1 | 10/2016 | Singh et al. | |
| 2018/0101813 | A1* | 4/2018 | Paat | H04N 7/185 |
| 2018/0213578 | A1* | 7/2018 | Tachibana | G06K 7/10722 |
| 2018/0288817 | A1* | 10/2018 | Windorfer | G06K 7/1095 |
| 2020/0159221 | A1* | 5/2020 | Wu | G05D 1/0278 |

FOREIGN PATENT DOCUMENTS

| | | | | |
|---|---|---|---|---|
| CN | 105744352 | | 7/2016 | |
| EP | 3386153 | A1 | 10/2018 | |
| EP | 3427906 | A1 * | 1/2019 | ........... G06K 7/1417 |
| FR | 2938393 | A1 | 5/2010 | |
| KR | 1020040080584 | | 9/2004 | |
| KR | 1020120114669 | | 10/2012 | |
| KR | 10-2014-0077093 | A | 6/2014 | |
| KR | 1020150026528 | | 3/2015 | |
| KR | 1020150077231 | | 7/2015 | |
| WO | WO-2015007315 | A1 * | 1/2015 | ........... A47L 9/2857 |

* cited by examiner

HOME APPLIANCE FOR INFORMATION REGISTRATION AND METHOD FOR REGISTERING INFORMATION OF HOME APPLIANCE

This application is a National Stage Entry of International Application No. PCT/KR2018/000592 filed Jan. 12, 2018, which claims priority to Korean Application Nos. 10-2017-0006027 filed Jan. 13, 2017 and 10-2017-0154717 filed Nov. 20, 2017, all of which are incorporated herein by reference.

TECHNICAL FIELD

The present invention relates to Internet of Things (IoT) of a home appliance.

BACKGROUND ART

Internet of Things (IoT) refers to intelligent technology and services for connecting objects to perform mutual communication of information between the human and an object and between objects based on the Internet. In particular, mutual communication of information between objects refers to transmission and reception of information between devices themselves, which are connected to the Internet, and processing of the information without human intervention.

Technology for embodying IoT includes 'sensing technology' for detecting a surrounding situation (an object or an environment), 'network technology' for connecting an object to the Internet, 'service interface technology' for processing and providing information, and the like.

With regard to the sensing technology, an environment sensor (e.g., a barometer, a hygrometer, a thermometer, a radioactivity detection sensor, a heat detection sensor, or a gas detection sensor), a chemical sensor (e.g., an electronic nose, a health care sensor, or a biometrics sensor), a proximity sensor, an illumination sensor, an acceleration sensor, a magnetic sensor, a gravity sensor, a gyroscope sensor, a motion sensor, an RGB sensor, an infrared (IR) sensor, an ultrasonic sensor, a remote detection sensor, SAR, radar, a light sensor (e.g., an image sensor), and so on have been known.

Network technology refers to technology for applying various wired technology and/or wireless technology to integrally connect a personal computer (PC), various devices and facilities, a portable terminal, and the like. The wired technology includes the Ethernet, PLC, IEEE 1394, home PNA, and the like, and the wireless technology includes IEEE 802.11 WLAN, IEEE 802.15 WPAN, UWB, Wi-Fi, Zigbee, Z-wave, Blue-Tooth, and the like.

A network includes a server for collect various pieces of information and transmitting various signals. Various home appliances having a function of transmitting information of a device or receiving information through a network have been developed. The home appliance includes a cleaner, a refrigerator, a clothes treatment apparatus (a washing machine, a clothes drier, a clothes refresher, or the like), an air conditioning machine (an air conditioner or the like), a heating apparatus (a boiler or the like), a cooking apparatus, a lighting apparatus, and the like.

In order to connect one specific home appliance to a network, information of the specific home appliance needs to be registered in the server.

For example, in order to use a robot cleaner in a field of IoT such as health care, a smart home, or remote control, the robot cleaner needs to be registered in the server. Although a recent mobile terminal supports a WiFi Direct service, a robot cleaner is capable of supporting only the legacy WiFi service through only a wireless router still, there is a problem in that the robot cleaner is not capable of exchanging information directly with the mobile terminal.

DISCLOSURE

Technical Problem

A conventional home appliance has a problem in that information is wirelessly transmitted only through a gateway in home, such as a wireless router and is not capable of registering information thereof in a server through a mobile communication network like a mobile terminal. Solution of the present invention is to overcome the problem.

When a manufacturer of a home appliance and a manufacturer of a mobile terminal are different from each other in order to register the home appliance in a server through a mobile terminal, there is a problem in that compatibility is adversely affected. Other solution of the present invention is to overcome the problem.

There is a problem in that a home appliance, a display function of which is not relatively important, has a difficulty in registering a home appliance in a server through a display screen and in that a user experiences inconvenience. Other solution of the present invention is to overcome the problem.

Other solution of the present invention is to enlarge a range in which a camera of a home appliance is used.

Technical Solution

To overcome the problems, the present invention provides a technical solution for receiving auxiliary information required to register information on a home appliance in a server and registering the information on the home appliance in the server using the auxiliary information.

To overcome the problems, the present invention provides a technical solution for generating auxiliary information using a mobile terminal, providing the auxiliary information to a home appliance, and registering information on the home appliance in the server using the auxiliary information.

To overcome the problems, the present invention provides a technical solution for selecting a wireless router for transmitting the information in a home appliance that is not capable of transmitting information thereof directly to a server.

To overcome the problems, the present invention provides a technical solution for selecting a wireless router using auxiliary information and registering information of a home appliance through the wireless router.

In accordance with the present invention, a home appliance for information registration includes a body, a wireless communication unit connected to a wireless router using a wireless communication method and configured to transmit information, a camera attached to the body and configured to detect registration auxiliary information generated by a mobile terminal, and a controller configured to perform control to select the wireless router based on information acquired through the registration auxiliary information and to transmit device registration information including identification information thereof to a server through the selected wireless router.

The controller may acquire information on a wireless router to be wirelessly connected to the wireless communication unit through the registration auxiliary information, and may select the wireless router based on the wireless router information.

The controller may further acquire server registration information required for registration in a server through the registration auxiliary information.

The server registration information may include security authentication information.

The controller may transmit the device registration information and the server registration information to the server through the wireless router.

The registration auxiliary information may include a quick response (QR) code.

The home appliance may further include a sensing unit configured to detect an orientation angle of a screen of the mobile terminal positioned adjacent to the camera, and a driver configured to move the body. In this case, when the camera does not detect the registration auxiliary information, the controller may rotate the body by a first angle through the driver based on an orientation angle of the screen, detected from the sensing unit, and may control the camera to re-detect the registration auxiliary information from the mobile terminal at the rotated first angle.

When the camera does not detect the registration auxiliary information after the body is rotated by the first angle, the controller may rotate the camera by a second angle through the driver and may control the camera to re-detect the registration auxiliary information from the mobile terminal at the rotated second angle.

In accordance with the present invention, a method of registering information of a home appliance includes operation (a) in which a mobile terminal generates registration auxiliary information, operation (b) in which a camera of the home appliance detects the registration auxiliary information, operation (c) in which the home appliance selects a wireless router based on information acquired through the registration auxiliary information and is wirelessly connected to the selected wireless router, and operation (d) in which the home appliance transmits device registration information including identification information thereof to a server through the selected wireless router.

Operation (c) may include acquiring information on a wireless router to be wirelessly connected to the home appliance through the registration auxiliary information and selecting the wireless router based on the wireless router information, by the home appliance.

The home appliance may further acquire server registration information required for registration in a server through the registration auxiliary information.

The server registration information may include security authentication information. Operation (d) may include transmitting the device registration information and the server registration information to the server through the wireless router, by the home appliance.

The registration auxiliary information may include information on a wireless router to be wirelessly connected to the home appliance and server registration information required for registration in the server through the registration auxiliary information.

The method may further include, after operation (a), performing a registration result request operation of making a request to the server for a registration result by the mobile terminal to enable the server to transmit the registration result of the home appliance to the mobile terminal.

The home appliance may acquire the wireless router information and the server registration information through the registration auxiliary information. Operation (c) may include selecting the wireless router based on the wireless router information by the home appliance. Operation (d) may include transmitting the device registration information and the server registration information to the server through the wireless router by the home appliance. The registration result request operation may include making a request to the server for the registration result of the server registration information by the mobile terminal The method may further include a registration result processing operation in which the server transmits a registration result of the home appliance to the home appliance and the mobile terminal.

The method may further include, prior to operation (b), performing a home appliance selection operation of selecting a home appliance as a registration target through the mobile terminal.

The method may further include, prior to operation (b) after the home appliances selection operation, outputting information for guiding a position of a camera of the selected home appliance by the mobile terminal.

The method may further include, prior to operation (b) after the home appliance selection operation, outputting information for guiding recognition mode conversion of the selected home appliance by the mobile terminal.

Operation (a) may include selecting a wireless router to be wirelessly connected to the home appliance through the mobile terminal before the registration auxiliary information is generated.

Operation (a) may include generating the registration auxiliary information based on information of the wireless router selected in operation (a).

Wireless router information of the wireless router selected in operation (a) and server registration information required for registration in the server may be transmitted to the sever through the selected wireless router using a first wireless interface by the mobile terminal. The wireless router information and the server registration information may be transmitted directly to the server without using the wireless router as a medium using a different second wireless interface from the first wireless interface by the mobile terminal. When the wireless router information transmitted through the first wireless interface is the same as the wireless router information transmitted through the second wireless interface, the server may transmit a confirmation message to the mobile terminal.

Advantageous Effects

According to the present invention, even if there is no wireless interface for direct wireless communication between a home appliance for performing information registration and a server, the home appliance may transmit information thereof to a server and may register the information in the server through another wireless interface using auxiliary information for wireless communication.

According to the present invention, registration auxiliary information may be generated using a mobile terminal and may be received from a mobile terminal by a home appliance, and information of the home appliance may be registered in the server using the registration auxiliary information.

A home appliance for information registration may transmit information to the server through a wireless router, and thus it is not required to include a wireless communication unit for performing a communication service through a separate mobile communication network.

According to the present invention, even in connection with a wireless router is released, a mobile terminal may be notified of this, and a home appliance may transmit information thereof to a server through another wireless router.

According to the present invention, when a home appliance does not support a WiFi direct service with a mobile terminal or mobile terminals have different access standards, the home appliance may transmit information thereof to a server.

The present invention may overcome a problem in which compatibility is adversely affected if manufacturers of a mobile terminal and a home appliance are different when only an application is installed in the mobile terminal.

In an environment including a plurality of wireless routers, a wireless router as a medium between a home appliance and a server may be easily selected through the wireless router information.

Irrespective of device registration information of the home appliance, a mobile terminal may pre-generate registration auxiliary information based on wireless router information and server registration information, and thus it is not required that an application has registration information of each device, and information on different types of home application may be registered using only one application.

In addition, a user may easily register information through guidance related to selection of a home appliance.

BRIEF DESCRIPTION OF THE DRAWINGS

In FIG. 10, a wireless router as a medium of communication between the home appliance 1000 and the server 400 is omitted. In addition, it is understood that a wireless router as a medium of a communication procedure between the application 500 and the server 400 is omitted in FIG. 10.

FIG. 13 illustrates context displayed on a screen of the mobile terminal 200 in a home appliance selection operation S210.

FIG. 14 illustrates context displayed on a screen of the mobile terminal 200, for making a request to a user for checking whether a current home appliance is a home appliance to be registered in a server.

FIG. 15 illustrates context displayed on a screen of the mobile terminal 200 in a recognition mode setting guidance operation S220.

FIG. 16 illustrates context displayed on a screen of the mobile terminal 200 in a wireless router selection operation S260.

FIG. 17 illustrates examples (a) and (b) of context displayed on a screen of the mobile terminal 200 in a camera position guidance operation S230.

FIG. 18 illustrates context displayed on a screen of the mobile terminal 200 in a recognition request operation S271 of a QR code (registration auxiliary information).

FIG. 19 illustrates context displayed on a screen of the mobile terminal 200 in a standby operation S750 until a registration result of a home appliance is received after the mobile terminal 200 makes a request to a server for a registration result of a home appliance.

FIG. 20 illustrates context displayed on a screen of the mobile terminal 200 in operation S623 in which a registration result is shown to a user when a home appliance is successfully registered.

DETAILED DESCRIPTION OF THE PREFERRED EMBODIMENTS

Hereinafter, the present invention will be described in detail by explaining exemplary embodiments of the invention with reference to the attached drawings. The terminology used herein is for the purpose of describing particular embodiments only and is not intended to be limiting of the present invention. The terminology used herein is for the purpose of describing particular embodiments only and is not intended to be limiting of the present invention. Unless otherwise defined, all technical terms used herein have the same meaning as commonly understood by one of ordinary skill in the art to which this present invention belongs and will not be interpreted in overly wide or narrow sense unless expressly so defined herein. If a term used herein is a wrong term by which one of ordinary skill in the art cannot correctly understand the present invention, the wrong term should be replaced by a technical term by which one of ordinary skill in the art can correctly understand the present invention. It will be further understood that terms, such as those defined in commonly used dictionaries, should be interpreted as having a meaning that is consistent with their meaning in the context of the relevant art and will not be interpreted in an overly narrow sense.

Figure 3:
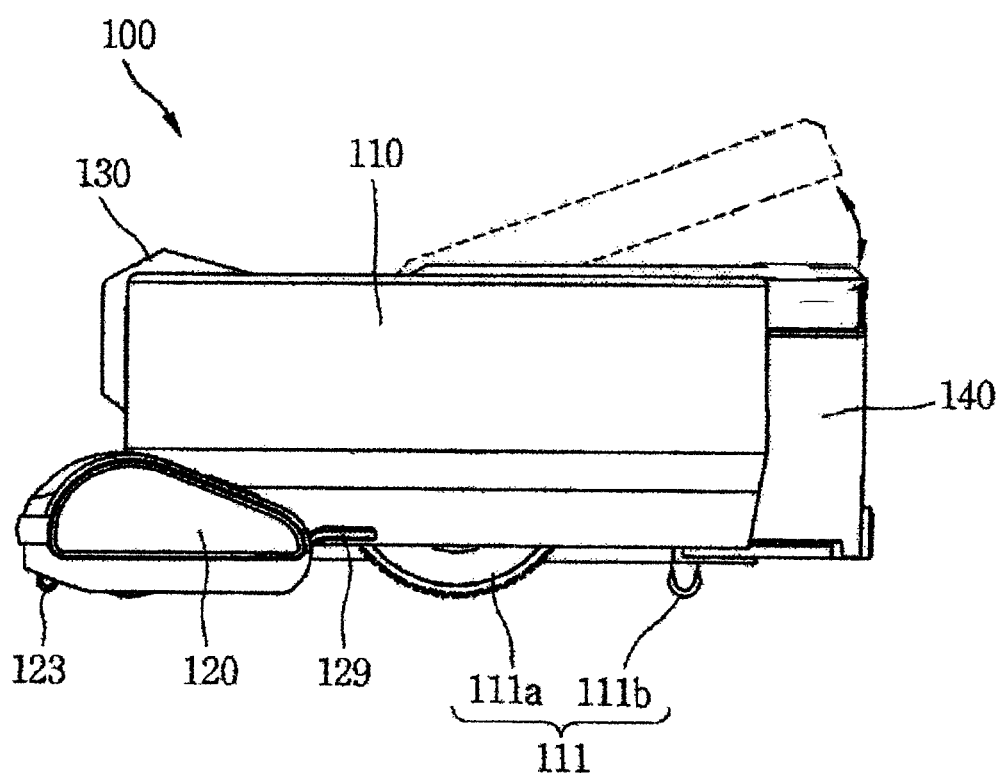
FIG. 3 is a side view of the robot cleaner illustrated in FIG. 1.

The description will be given in terms of a mobile robot 100 as an example of a home appliance 1000. Although FIG. 3 illustrates an example of a robot cleaner 100 as one of the mobile robot 100 in detail, the present invention may be applied to various home appliances 1000 without being limited thereto. For example, the present invention may be applied to a mobile robot, a cleaner, a refrigerator, a clothes treatment apparatus (a washing machine, a clothes drier, clothes refresher, or the like), an air conditioning machine (an air conditioner or the like,), a heating apparatus (a boiler or the like), a cooking apparatus, a lighting apparatus, or the like. The present invention may also be applied to a display apparatus such as a television (TV), but may be applied to a home appliance, a display function of which is less important than other apparatuses.

Figure 1:
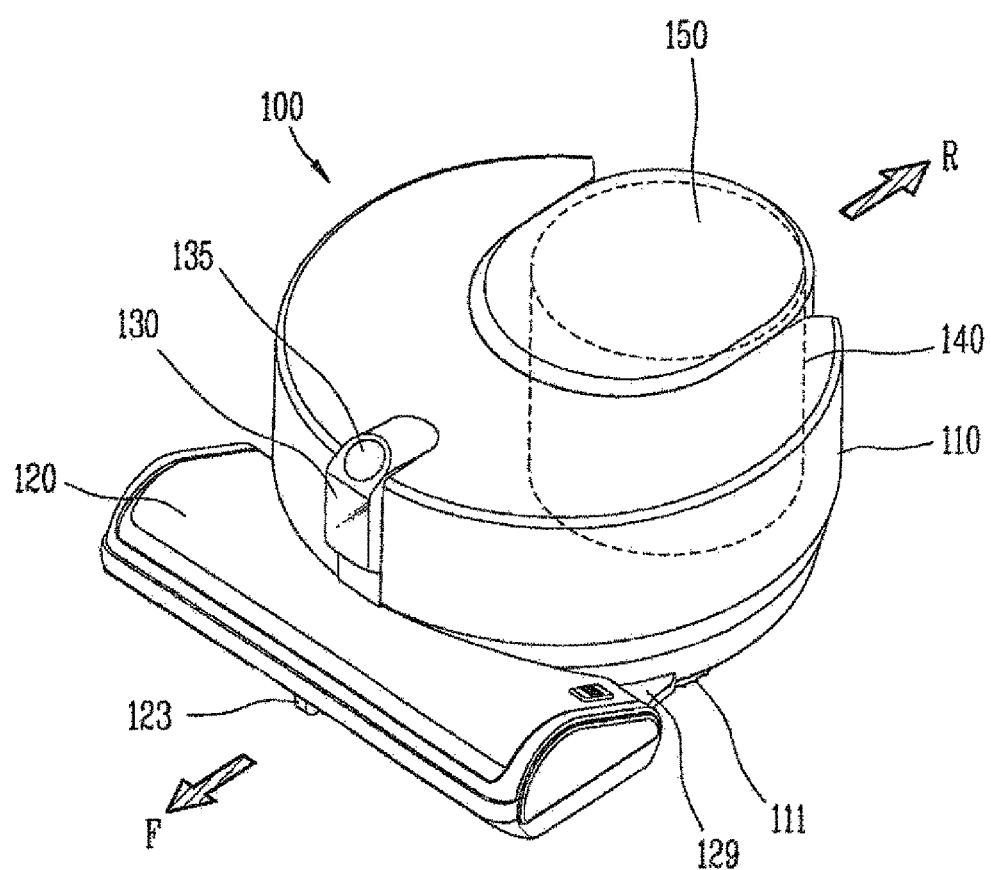
FIG. 1 is a perspective view of a robot cleaner as an example of a home appliance according to the present invention.
Figure 2:
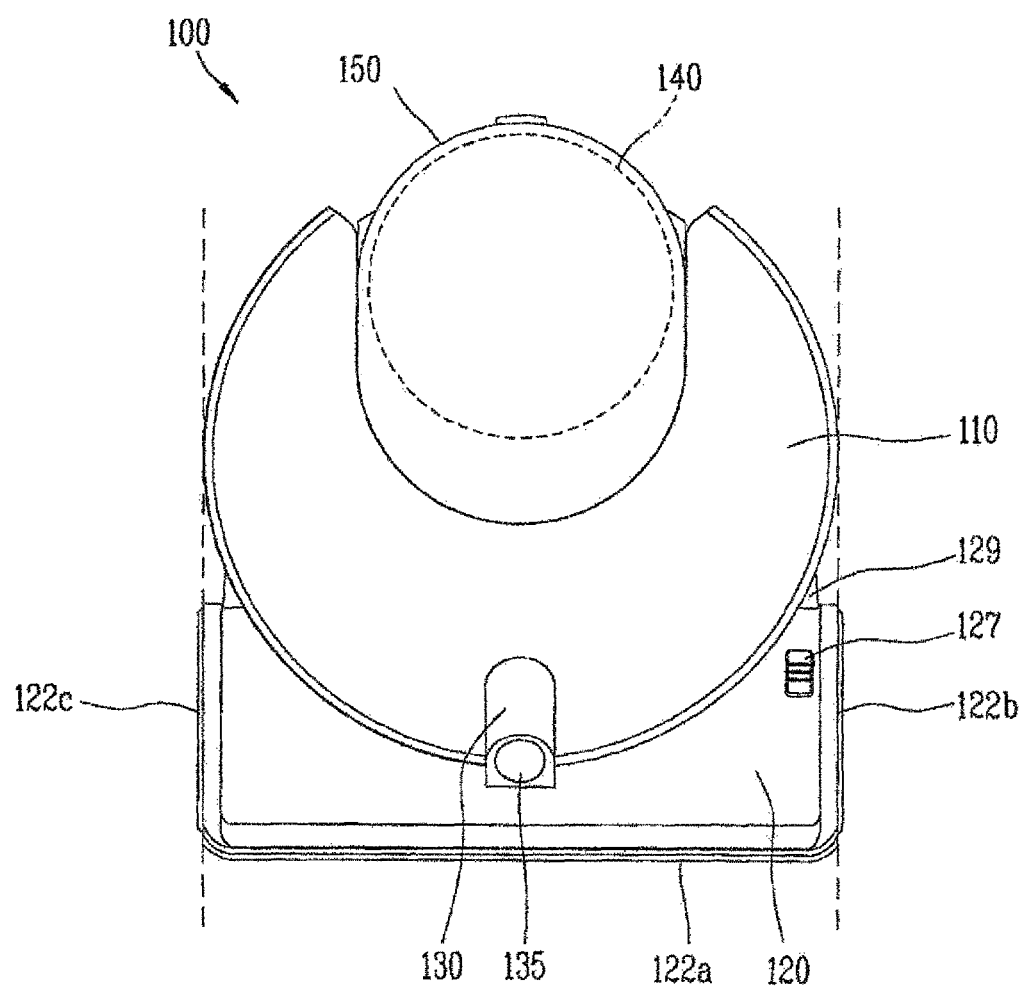
FIG. 2 is a plan view of the robot cleaner illustrated in FIG. 1.

FIG. 1 is a perspective view showing an example of the robot cleaner 100 according to the present invention. FIG. 2 is a plan view of the robot cleaner 100 illustrated in FIG. 1. FIG. 3 is a side view of the robot cleaner 100 illustrated in FIG. 1.

For reference, in the specification, the mobile robot, the robot cleaner, and an autonomous driving cleaner may have the same meaning.

Referring to FIGS. 1 to 3, the robot cleaner 100 may perform a function of cleaning the floor while autonomously driving in a predetermined area. Here, the floor cleaning may include absorption of dust (which includes a foreign object) or floor wiping.

The robot cleaner 100 may include a cleaner body 110, an absorption unit 120, a sensing unit 130, and a dust container 140.

The cleaner body 110 may include a control (not shown) configured to control the robot cleaner 100, and a wheel unit 111 configured to drive the robot cleaner 100. The robot cleaner 100 may be moved in forward, backward, left, and right directions or may be rotated by the wheel unit 111.

The wheel unit 111 may include main wheels 111a and sub wheels 111b.

The main wheels 111a may be included in opposite sides of the cleaner body 110, respectively, and may be configured to be rotated in one direction or other directions according to a control signal of a controller. Each of the main wheels 111a may be configured to be independently driven. For example, the main wheels 111a may be driven by different motors, respectively.

The sub wheels 111b may support the cleaner body 110 along with the main wheels 111a and may assist driving of the robot cleaner 100 by the main wheel 111a. The sub wheel 111b may also be included in the absorption unit 120 that will be described below.

As described above, the controller may control driving of the wheel unit 111, and thus the robot cleaner 100 may be autonomously driven on the floor.

A battery (not shown) configured to supply power to the robot cleaner 100 may be installed in the cleaner body 110. The battery may be configured to be chargeable and may be detachably configured from a bottom surface of the cleaner body 110.

The absorption unit 120 may protrude from one side of the cleaner body 110 and may be configured to absorb air containing dust. The one side may corresponds to a direction in which the cleaner body 110 is driven in a forward direction F, that is, a front side of the cleaner body 110.

The drawings illustrate the case in which the absorption unit 120 protrudes both in a forwards direction and in opposite right and left directions from the one side of the cleaner body 110. In detail, a front end of the absorption unit 120 may be spaced apart forwards from the one side of the cleaner body 110, and opposite right and left ends of the absorption unit 120 may be spaced apart in right and left directions from the one side of the cleaner body 110, respectively.

The cleaner body 110 may be formed in a circular shape and opposite right and left sides of a rear end of the absorption unit 120 may protrude from the cleaner body 110 in opposite right and left directions, and thus an empty space, that is, a gap may be formed between the cleaner body 110 and the absorption unit 120. The empty space may be a space between opposite right and left ends of the cleaner body 110 and the opposite right and left ends of the absorption unit 120 and may be recessed into the robot cleaner 100.

When an obstacle is caught in the empty space, a problem may arise in that the robot cleaner 100 is caught by the obstacle and is not capable of being moved. To overcome this, cover members 129 may be disposed to cover at least one a portion of the empty space. The cover members 129 may be included in the cleaner body 110 or the absorption unit 120. According to the present embodiment, the cover members 129 may protrude from the opposite sides of the rear end of the absorption unit 120, respectively and may be disposed to cover an outer circumference of the cleaner body 110.

The cover member 129 may be disposed to fill at least a portion of the empty space, that is, the empty space between the cleaner body 110 and the absorption unit 120. Accordingly, an obstacle may be prevented from being caught in the empty space or even if an obstacle is caught in the empty space, the robot cleaner 100 may easily escape from the obstacle.

The cover member 129 protrudes from the absorption unit 120 may be supported by the outer circumference of the cleaner body 110. When the cover member 129 protrudes from the cleaner body 110, the cover member 129 may be supported by a rear surface portion of the absorption unit 120. According to the above configuration, when the absorption unit 120 collides with an obstacle and is shocked by the obstacle, a portion of the shock may be transmitted to the cleaner body 110, and thus the shock may be dispersed.

The absorption unit 120 may be detachably coupled to the cleaner body 110. When the absorption unit 120 is detached from the cleaner body 110, a mop module (not shown) may replace the detached absorption unit 120 and may be detachably coupled to the cleaner body 110. Accordingly, when a user intends to remove dust from the floor, the user may install the absorption unit 120 in the cleaner body 110, and when the user intends to wipe the floor, the user may install the mop module in the cleaner body 110.

When the absorption unit 120 is installed in the cleaner body 110, the installation may be guided by the aforementioned cover member 129. That is, the cover member 129 may be disposed to cover the outer circumference of the cleaner body 110, and thus a relative position of the absorption unit 120 with respect to the cleaner body 110 may be determined.

The sensing unit 130 may be disposed on the cleaner body 110. As illustrated, the sensing unit 130 may be disposed at one side of the cleaner body 110, at which the absorption unit 120 is disposed, that is, on a front side of the cleaner body 110.

The sensing unit 130 may be disposed to overlap the absorption unit 120 in upwards and downwards directions of the cleaner body 110. The sensing unit 130 may be disposed on the absorption unit 120 and may detect a forward obstacle, a geographic feature, or the like to prevent the absorption unit 120 positioned at the foremost side of the robot cleaner 100 from colliding with the obstacle.

The sensing unit 130 may be configured to perform other sensing functions other than such a detection function, which will be described below in detail.

A camera 135 may be disposed in the cleaner body 110. As illustrated, the camera 135 may be disposed at one side of the cleaner body 110, at which the absorption unit 120 is disposed, that is, on a front side of the cleaner body 110.

The camera 135 may be disposed to overlap the absorption unit 120 in upwards and downwards directions of the cleaner body 110. The camera 135 may be disposed on the absorption unit 120 and may detect a forward obstacle, a geographic feature, or the like to prevent the absorption unit 120 positioned at the foremost side of the robot cleaner 100 from colliding with the obstacle.

The camera 135 may be configured to perform other information detection functions other than such a detection function, which will be described below in detail.

The cleaner body 110 may include a dust accommodation portion 113 and the dust container 140 configured to separate and collect dust in absorbed air may be detachably coupled to the dust accommodation portion 113. As illustrated, the dust accommodation portion 113 may be formed at the other side of the cleaner body 110, that is, a rear side of the cleaner body 110.

A portion of the dust container 140 may be accommodated in the dust accommodation portion 113, in which case another portion of the dust container 140 may protrude towards a rear side of the cleaner body 110 [i.e., a reserve direction R opposite to the forward direction F].

An entrance 140a into which air containing dust is introduced and an exit 140b through which air from which dust is removed may be formed in the dust container 140, and when the dust container 140 is installed in the dust accommodation portion 113, the entrance 140a and the exit 140b may be configured to be respectively connected to a first opening 110a and a second opening 110b that are formed in an internal wall of the dust accommodation portion 113 의 internal wall.

An intake flow passage inside the cleaner body 110 may correspond to a flow passage to the first opening 110a from an inlet (not shown) connected to a connection portion 120b" and an exhaust flow passage may correspond to an exhaust port 112 from the second opening 110b.

According to such a connection relationship, air containing air introduced through the absorption unit 120 may be introduced into the dust container 140 through the intake flow passage inside the cleaner body 110 and air and dust may be separated from each other through a filter and a cyclone of the dust container 140. Dust may be collected in the dust container 140, and air may be discharged through the dust container 140, may be transmitted through the exhaust flow passage inside the cleaner body 110, and then may be lastly discharged to the outside through the exhaust port 112.

Although an autonomous driving cleaner enters an obstacle environment having various conditions, the cleaner may detect a shape of the obstacle environment using a sampling result of three-dimensional (3D) coordinate information, and thus may set an appropriate driving path of the detected obstacle environment.

The autonomous driving cleaner may acquire a grip map formed with a plurality of layers to more accurately detect a position of the body.

The autonomous driving cleaner may rapidly process the 3D coordinate information while maintaining performance of a controller and may prevent increase in manufacturing costs.

The autonomous driving cleaner may set an appropriate driving path for the obstacle environment to prevent unnecessary power consumption, and thus may provide a cleaner with enhanced power efficiency.

Hereinafter, an embodiment related to components of the home appliance 1000 (e.g., the mobile robot 100) will be described with reference to FIG. 4.

The home appliance 1000 (e.g., a mobile robot) according to an embodiment of the present invention may include at least one of a communication unit 1100, an input unit 1200, a driver 1300, a sensing unit 1400, an output unit 1500, a power unit 1600, a memory 1700, a controller 1800, a camera 1900, or a combination thereof.

Figure 4:
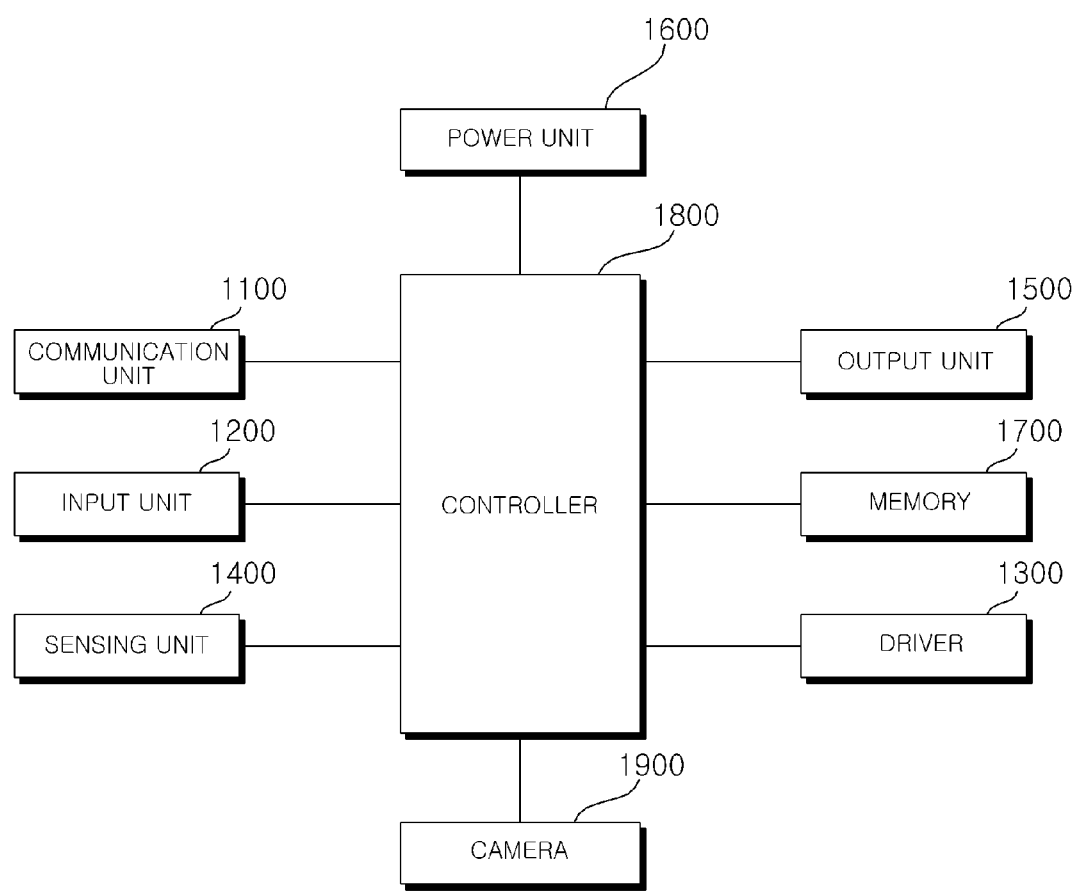
FIG. 4 is a block diagram showing components of a home appliance according to an embodiment of the present invention.

In this case, the components illustrated in FIG. 4 are not required, and thus greater or fewer components than in FIG. 4 may configure the home appliance 1000 (e.g., a mobile robot), needless to say. Hereinafter, each component will be described.

First, the power unit 1600 may include a battery that is rechargeable by an external commercially available power source and may supply power to the home appliance 1000 (e.g., a mobile robot). The power unit 1600 may supply driving power to each component included in the home appliance 1000 (e.g., a mobile robot) and may supply operating power required to drive the home appliance 1000 (e.g., a mobile robot) or to perform a specific function.

In this case, the controller 1800 may detect the remaining power of a battery. For example, when the remaining power of the mobile robot 100 is sufficient, the controller 1800 may control the mobile robot 100 to be moved to a charging stand connected to the external commercially available power source, and to receive charging current from the charging stand, and to charge the battery. The battery may be connected to a battery detection unit, and information on the remaining power of the battery and a state of charge (SoC) of the battery may be transmitted to the controller 1800. The output unit 1500 may display the remaining power of the battery on a screen by the controller 1800.

The mobile robot 100 of the home appliance 1000 may further include the driver 1300. The driver 1300 may include a motor and may drive the motor to rotate right and left main wheels in opposite directions to rotate or move the body. The driver 1300 may move the body of the mobile robot 100 in forwards and backwards directions and right and left directions, may move the body in a curve, or may rotate the body in place.

The input unit 1200 may receive various control command about the home appliance 1000 (e.g., a robot cleaner) from the user. The input unit 1200 may include one or more buttons, and for example, may include a confirmation button, a setting button, or the like. The confirmation button may be a button for receiving a command for confirming various pieces of information of the home appliance 1000. The setting button may be a button for receiving a command for setting the information from the user.

The input unit 1200 may include an input resetting button for canceling previous user input and receiving user input again. The input unit 1200 may include a delete button for deleting preset user input. The input unit 1200 may include a button for setting or changing an operation mode. For example, the input unit 1200 of the mobile robot 100 may further include a button for receiving a command for returning to the charging stand.

The input unit 1200 may be installed in the form of a hard key, a soft key, a touchpad, or the like. The input unit 1200 may be configured in the form of a touchscreen along with the output unit 1500. The input unit 1200 may include a voice recognition sensor for receiving a voice command.

The output unit 1500 may visually output various pieces of information. The output unit 1500 may include a display. For example, the output unit 1500 of the mobile robot 100 may display a battery state, a driving method, or the like on a screen.

The output unit 1500 may output information on internal information of the home appliance 1000 (e.g., a mobile robot), which is detected by the sensing unit 1400. The output unit 1500 may output the current state of each component included in the home appliance 1000 (e.g., a mobile robot). The output unit 1500 may output information of an external state, which is detected by the sensing unit 1400. For example, the output unit 1500 of the mobile robot 100 may display obstacle information, position information, map information, or the like on the screen. The output unit 1500 may include a display formed in the form of one device of a light emitting diode (LED), a liquid crystal display (LCD), a plasma display panel, and an organic light emitting diode (OLED).

The output unit 1500 may acoustically output various pieces of information. The output unit 1500 may include a sound output device. The output unit 1500 may include a sound output device for acoustically outputting a procedure or result of an operation performed by the home appliance 1000 (e.g., a mobile robot). For example, the output unit 1500 may output an external warning horn to the outside according to a warning signal generated by the controller 1800.

In this case, the sound output device may be a device for outputting sound, such as a beeper or a speaker, and the output unit 1500 may output sound to the outside through the sound output device using audio data, message data, or the like, which has a predetermined pattern stored in the memory 1700.

The communication unit 1100 may be connected to a terminal device and/or other devices (peripheral devices) positioned within a specific region using one of wired, wireless, and satellite communication methods and may transmit and receive a signal and data. In the description, other devices around the home appliance 1000 as a reference to which the present invention is applied or within a network may be referred to as a 'peripheral device'.

The communication unit 1100 may transmit and receive data to and from a peripheral device positioned in a specific region. In this case, the peripheral device may be any device as long as the device is connected to a network to transmit and receive data. For example, the peripheral device may be a device such as a mobile robot, an air conditioning device, a heating apparatus, an air filter apparatus, an electric lamp, a TV, or a vehicle. The peripheral device may be a device for control of a door, a window, a faucet valve, a gas valve, or the like. The peripheral device may be a sensor for detecting temperature, humidity, atmospheric pressure, gas, or the like.

The memory 1700 may store a control program for controlling or driving a robot cleaner and data based thereon. The memory 1700 may store audio information, image information, or the like. For example, the memory 1700 of the mobile robot 100 may store obstacle information, position information, map information, or the like. The memory 1700 of the mobile robot 100 may store information related to a driving pattern.

The memory 1700 may mainly use a non-volatile memory. Here, the non-volatile memory (NVM or NVRAM) may be a storage device for continuously retaining stored information even if power is not supplied, and for example, may include a read only memory (ROM), a flash memory, magnetic computer recording device (e.g., a hard disk, a diskette drive, or a magnetic tape), an optical disk drive, a magnetic random access memory (RAM), a phase-change RAM (PRAM), or the like.

The sensing unit 1400 may detect external environment information. The sensing unit 1400 may include an external signal detection sensor. For example, the sensing unit 1400 of the mobile robot 100 may include at least one of a forward detection sensor, a cliff detection sensor, a lower camera sensor, or an upper camera sensor.

The external signal detection sensor may detect an external signal of the home appliance 1000 (e.g., a mobile robot). The external signal detection sensor may include, for example, an infrared ray sensor, an ultrasonic sensor, a radio frequency (RF) sensor, or the like.

The sensing unit 1400 will be described below in detail in terms of an example in which the home appliance 1000 is the mobile robot 100.

For example, the mobile robot 100 may receive a notification signal generated by the charging stand and may check a position and direction of the charging stand using the external signal detection sensor. In this case, the charging stand may transmit the notification signal indicating a direction and a distance to allow the mobile robot 100 to return to the charging stand. That is, the mobile robot may receive a signal transmitted from the charging stand, may determine the current position of the charging stand, may set a moving direction, and may return to the charging stand.

The forward detection sensor of the mobile robot 100 may be installed along a front side of the mobile robot 100, in detail, along an outer circumference of a side surface of the mobile robot 100 at a predetermined interval. The forward detection sensor may be positioned on at least one side surface of the mobile robot 100 and may detect a forward obstacle, and the forward detection sensor may detect an object, in particular, an obstacle present on a moving path of the mobile robot 100, and may transmit detection information to the controller 1800. That is, the forward detection sensor may detect a projection, house furnishings, furniture, a wall surface, a wall edge, or the like, present on a moving path of the mobile robot 100, and may transmit the information to the controller 1800.

The forward detection sensor may be, for example, an infrared ray sensor, an ultrasonic sensor, an RF sensor, a terrestrial magnetism sensor, or the like. The mobile robot 100 may use one type of sensor or, as necessary, may simultaneously use two types of sensors, as the forward detection sensor.

For example, in general, the ultrasonic sensor may be mainly used to detect an obstacle at a remote distance. The ultrasonic sensor may include a transmitter and a receiver, and the controller 1800 may determine an obstacle according to whether an ultrasonic wave emitted through the transmitter is reflected off the obstacle or the like and is received by the receiver, and may calculate a distance with the obstacle using an ultrasonic wave emission time and an ultrasonic wave reception time.

The controller 1800 may compare the ultrasonic wave emitted from the transmitter and the ultrasonic wave received by the receiver and may detect information related to the size of the obstacle. For example, as a larger amount of ultrasonic wave is received by the receiver, the controller 1800 may determine that the obstacle has a larger size.

According to an embodiment, a plurality of (e.g., 5) ultrasonic sensors may be installed along an outer circumference of a front side surface of the mobile robot 100. In this case, in detail, the ultrasonic sensor may be configured in such a way that the transmitters and the receivers are alternately installed on a front surface of mobile robot.

That is, the transmitters may be disposed to be spaced apart at right and left sides from the center of a front surface of a body, and one transmitter or more or more transmitters may be disposed between the receivers and may form a reception region of an ultrasonic wave signal reflected off the obstacle or the like. According to such arrangement, the reception region may be enlarged while the number of sensors is reduced. An emission angle of the ultrasonic wave may be maintained in the range in which signals do not affect each other to prevent a crosstalk phenomenon. In addition, the receive sensitivity of the receivers may be differently set.

The ultrasonic sensor may be installed upwards at a predetermined angle to output ultrasonic wave emitted from the ultrasonic sensor upwards, and in which case the ultrasonic sensor may further include a predetermined blocking member in order to prevent the ultrasonic wave from being emitted downwards.

As described above, the forward detection sensor may simultaneously use two types of sensors, and accordingly, the forward detection sensor may use one type of sensor among an infrared ray sensor, an ultrasonic sensor, an RF sensor, and the like.

For example, the forward detection sensor may include an infrared ray sensor as a different type of sensor other than the ultrasonic sensor.

The infrared ray sensor may be installed on the outer circumference of the mobile robot 100 along with the ultrasonic sensor. The infrared ray sensor may also detect an obstacle present at a front side or side surface thereof and may transmit the obstacle information to the controller 1800. That is, the infrared ray sensor may detect a projection, house furnishings, furniture, a wall surface, a wall edge, or the like, present on the moving path of the mobile robot 100, and may transmit the information to the controller 1800. Accordingly, a body of the mobile robot 100 may be moved in a specific region without collision with the obstacle.

The cliff detection sensor (or a cliff sensor) may detect an obstacle on the floor that supports the body of the mobile robot 100 using various types of light sensors mainly.

That is, the cliff detection sensor may be installed on a rear surface of the mobile robot 100 on the floor, in which case the cliff detection sensor may be installed at a different position according to a type of the mobile robot 100, needless to say. The cliff detection sensor may be positioned on the rear surface of the mobile robot 100 and may detect the obstacle on the floor, and the cliff detection sensor may be an infrared ray sensor, an ultrasonic sensor, an RF sensor, a position sensitive detector (PSD) sensor, or the like, which includes a light emitter and a light receiver, like the obstacle detection sensor.

For example, any one of the cliff detection sensor may be installed at a front side of the mobile robot 100, and two other cliff detection sensors may be installed at a relatively rear side.

For example, the cliff detection sensor may be a PSD sensor, but may also include a plurality of different types of sensors.

The PSD sensor may detect a position at short and long distances of incident light through one p-n junction using semiconductor surface resistance. The PSD sensor may include a 1D PSD sensor for detecting light in a one-axis direction only and a 2D PSD sensor for detecting a light position on a plane, in which case both the 1D and 2D PSD sensors may include a pin photodiode structure. The PSD sensor may be a type of infrared ray sensor, may measure an angle of infrared ray, which is transmitted by the PSD sensor and then is reflected back thereto, to measure a distance using the infrared ray. That is, the PSD sensor may calculate a distance with an obstacle using a triangulation method.

The PSD sensor may include a light emitter for emitting infrared ray to the obstacle, and a light receiver for receiving the infrared ray that is reflected back to the PSD sensor from the obstacle, in which case the PSD sensor may be configured in the form of a module. When the obstacle is detected using the PSD sensor, a stable measured value may be obtained irrespective of the reflectivity of the obstacle and a color difference.

The controller 1800 may measure an infrared ray angle between a light emitting signal of the infrared ray emitted by the cliff detection sensor toward the floor and a reflective signal that is reflected and received by the obstacle, may detect a cliff, and may analyze the depth of the cliff.

The controller 1800 may determine whether to cross the cliff according to a state of a floor surface of a cliff, which is detected using the cliff detection sensor, and may determine that the mobile robot 100 crosses the cliff according to the determination result. For example, the controller 1800 may determine whether a cliff is present and the depth of the cliff through the cliff detection sensor, and then may enable the mobile robot 100 to cross the cliff only when a reflective signal is detected through the cliff detection sensor.

In another example, the controller 1800 may also determine that the mobile robot 100 is raised using the cliff detection sensor.

The lower camera sensor may be included in the rear surface of the mobile robot 100 and may acquire image information on a lower side, that is, a floor surface (or a surface to be cleaned) during movement. The lower camera sensor may be referred to as an optical flow sensor as another term. The lower camera sensor may convert a downward image input from the image sensor included in the sensor to generate predetermined format of image data. The generated image data may be stored in the memory 1700.

One or more light sources may be installed adjacent to the image sensor. One or more light sources may emit light to a predetermined region of a floor surface photographed by the image sensor. That is, when the mobile robot is moved in a specific region along the floor surface, if the floor surface is flat, a predetermined distance may be maintained between the image sensor and the floor surface. In contrast, when the mobile robot 100 is moved on an irregular floor surface, the image sensor and the floor surface may be moved away from each other by a predetermined distance or greater due to unevenness of the floor surface and the obstacle. In this case, one or more light sources may be controlled by the controller 1800 to adjust the amount of emitted light. The light source may be a light emitting device for adjusting a light amount, for example, a light emitting diode (LED).

The home appliance 1000 may include the camera 1900. For example, the camera 1900 of the mobile robot 100 may include an upper camera (sensor) or a lower camera (sensor) that are disposed above or below the robot cleaner 100.

For example, the controller 1800 may detect a position of the mobile robot 100 irrespective of slip of the mobile robot 100 using the lower camera sensor of the mobile robot 100. The controller 1800 of the mobile robot 100 may compare and analyze image data captured by the lower camera sensor to calculate a moving distance and a moving direction, and may detect a position of the mobile robot 100 based on the calculated result. Information on the downward image of the mobile robot 100 may be used using the lower camera sensor, and thus the controller 1800 may perform robust correction with respect to the position of the mobile robot 100, which is calculated by another device.

The upper camera sensor of the mobile robot 100 may be installed toward an upwards or forwards direction of the mobile robot 100 and may photograph surroundings of the mobile robot. When the mobile robot 100 includes a plurality of upper camera sensors, camera sensors may be formed at an upper portion or a side surface of the mobile robot 100 at a predetermined distance or a predetermined angle.

Figure 5:
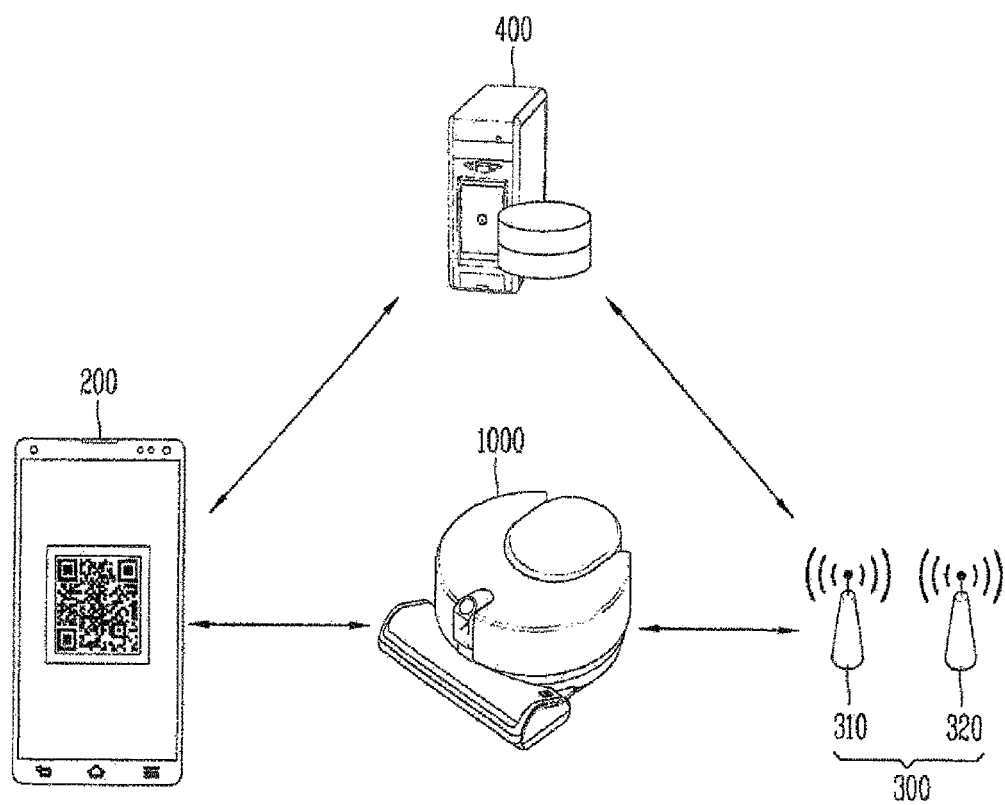
FIG. 5 is a conceptual diagram showing a method of registering information thereof in a server by a home appliance 1000.

Hereinafter, with reference to FIG. 5, a method in which the home appliance 1000 registers information thereof in a server 400 will be described with regard to an embodiment. In FIG. 5, the robot cleaner 100 illustrated in FIGS. 1 to 4 is illustrated as an example of the home appliance 1000, but as described above, the robot cleaner 100 is a merely an embodiment of the home appliance 1000 for explanation of the present invention. The home appliance 1000 (e.g., a robot cleaner) may receive auxiliary information from a mobile terminal 200, and may select any one from a plurality of wireless routers 300 based on the auxiliary information. The home appliance 1000 (e.g., a robot cleaner) may transmit information thereof to the server 400 through the selected wireless router.

Figure 6:
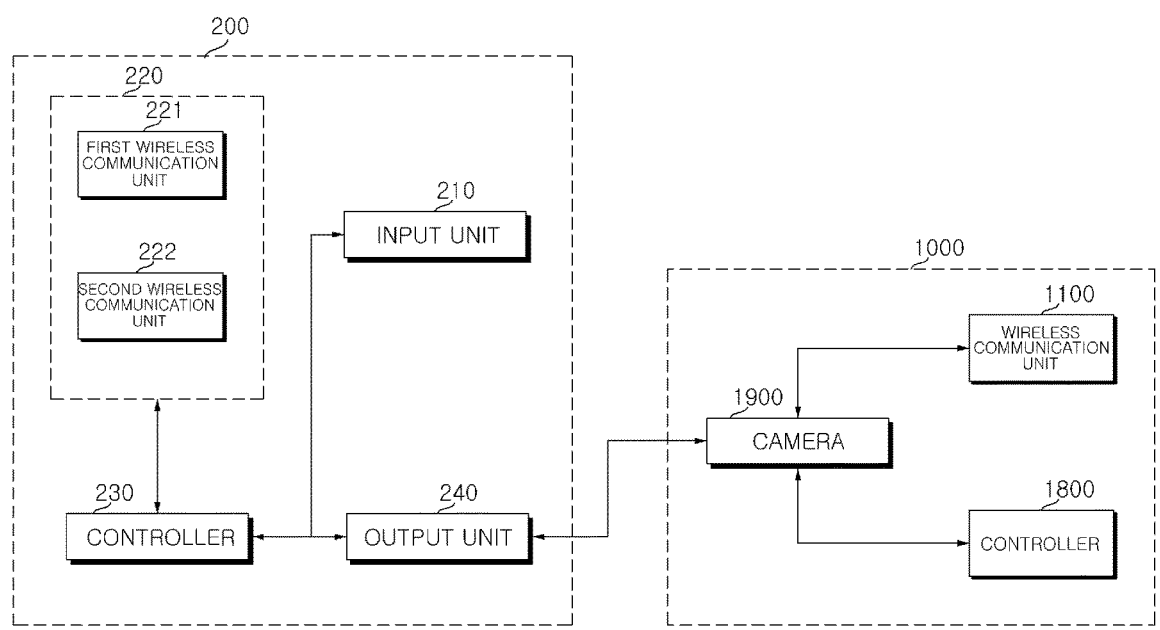
FIG. 6 is a block diagram showing components of the home appliance 1000 for information registration and a mobile terminal 200.

FIG. 5 illustrates an embodiment in which the home appliance 1000 (e.g., a robot cleaner) for registering Information according to the present invention receives auxiliary information required for information registration from the mobile terminal 200. In this regard, FIG. 6 is a block diagram showing components of the home appliance 1000 (e.g., a robot cleaner) and the mobile terminal 200. With reference to FIGS. 5 and 6, an operation of the home appliance 1000 (e.g., a robot cleaner) for performing information registration and an operation of the mobile terminal 200 therefor will be described below.

The wireless communication unit 1100 may be connected to a wireless router 300 using a wireless communication method and may transmit information. The wireless communication unit 1100 may be connected to the wireless router 300 positioned in a specific region using a wireless communication method and may transmit information. The wireless communication unit 1100 may be connected to a peripheral device positioned in a specific region using a wireless communication method and may be configured to transmit and receive a signal and data. In this case, wireless communication between the corresponding home appliance 1000 and the peripheral device may be achieved through any one of the plurality of wireless routers 300. The wireless communication unit 1000 may transmit and received information to and from the server 400 through the wireless router 300. The wireless communication unit 1000 may transmit information to the server 400 through the wireless router 300. That is, the wireless communication unit 1100 may not transmit information directly to the server 400 through a separate mobile communication network.

For example, the wireless communication unit 1100 may be connected to the mobile terminal 200 using a wireless communication method and may be configured to transmit and receive information.

In another example, the wireless communication unit 1100 may not transmit information directly to the mobile terminal 200. In this case, the wireless communication unit 1100 may exchange information with the server 400 or the mobile terminal 200 through only the wireless routers 300. For example, the mobile terminal 200 may support a WiFi direct service, but the wireless communication unit 1100 may support only a WiFi service. For example, WiFi direct supported in the mobile terminal 200 supports different access standards according to a type or OS type of a terminal, and accordingly, the wireless communication unit 1100 may be configured not to exchange information with the mobile terminal 200 through a WiFi direct service supported by the mobile terminal 200.

The camera 1900 may be attached to the home appliance 1000 (e.g., a robot cleaner). The camera 1900 may detect the auxiliary information generated by the mobile terminal 200. In this case, the auxiliary information may be registration auxiliary information for registering the home appliance 1000 (e.g., a robot cleaner) in the server 400.

The registration auxiliary information may include a quick response (QR) code. The registration auxiliary information may be generated in the form of a QR code. The registration auxiliary information may be generated by the mobile terminal 200 and may be detected by the camera 1900. The auxiliary information (the registration auxiliary information) may be detected by the camera 1900 as well as a QR code or may include an arbitrary form of information to be received through the input unit 1100 For example, the auxiliary information (the registration auxiliary information) may be included in one of a QR code, a European artical number (EAN) code, a bar code, or an RFID code.

The controller 1800 may acquire predetermined information through the registration auxiliary information detected by the camera 1900.

The controller 1800 may select the wireless router based on the information acquired through the registration auxiliary information. The controller 1800 may acquire information on a wireless router that is to be wirelessly connected to the wireless communication unit 1100 through the registration auxiliary information. The controller 1800 may select the wireless router based on the acquired wireless router information.

The controller 1800 may further acquire server registration information required for registration in the server through the registration auxiliary information. The controller 1800 may acquire wireless router information on the wireless router 300 to be wirelessly connected to the wireless communication unit 1100 and server registration information required for registration in the server 400 through the registration auxiliary information (e.g., a QR code).

The wireless router information may include information for identifying a wireless router. The wireless router information may include a wireless router identifier (ID). The wireless router information may selectively further include a wireless router password.

The server registration information may include at least one of a server type, a server name, or an authentication type used for logging on a server. The server registration information may further include a group name for listing registered servers, server connection attributes, a basic database to be connected by the server, a network protocol to be used during connection with the server, or a basic network packet size to be used.

The server registration information may include security authentication information. For example, the security authentication information may be an access token. The access token may be an object for explanation of security context in a process that requires security. Information of the access token may include user identification information, and authority information.

According to the present embodiment, the mobile terminal 200 may generate registration auxiliary information based on the security authentication information (e.g., an access token). In detail, the mobile terminal 200 may generate the security authentication information and other information in the form of a QR code through an application 500 The home appliance 1000 may acquire security authentication information (e.g., an access token) through the detected registration auxiliary information, and may perform security authentication using the acquired security authentication information during a process of making a request to the server 400 for product registration. In this case, the mobile terminal 200 may also transmit the security authentication information to the server 400. The server 400 may compare the security authentication information received from the mobile terminal 200 and the security authentication information received from the home appliance 1000 through the wireless router and may perform security authentication. Upon receiving the same security authentication information as the security authentication information, received from the mobile terminal 200, from the home appliance 1000 through the wireless router, the server 400 may transmit a result of information registration of the home appliance 1000 related to the corresponding security authentication information, to the mobile terminal 200. Here, information transmission and reception between the server 400 and the mobile terminal 200 may be directly performed without a wireless router as a medium or may be performed using the wireless router as a medium.

At least a portion of the aforementioned server registration information may be received by the home appliance 1000 (e.g., a robot cleaner) through the auxiliary information (e.g., a QR code), and the remaining information may be received by a selected wireless router among the wireless routers 300. For example, the server type and the server name may be received by the home appliance 1000 (e.g., a robot cleaner) through the auxiliary information (e.g., a QR code), and server connection attributes, a basic database to be connected by the server, a network protocol to be used during connection with the server, and a basic network packet size to be used may be received by the wireless router. Accordingly, the home appliance 1000 (e.g., a robot cleaner) may be wirelessly connected to the wireless router 300 using only minimum information, and protocol conversion for protocol matching with the server 400 may be performed by the wireless router 300. Here, the access token may be received by the home appliance 1000 through the auxiliary information.

The controller 1800 may select the wireless router 300 based on the wireless router information. Here, the controller 1800 may select the wireless router 300 based on only the acquired wireless router information, but may select the wireless router 300 based on the acquired wireless router information and server registration information. In this case, the wireless router may be an access point (AP), and the wireless router information may be an identifier for identifying the AP. For example, the identifier for identifying the AP may be a service set identifier (SSID).

A first wireless router 310 may be selected from the plurality of wireless routers 300 based on the acquired wireless router information. The first wireless router 310 may be selected from the plurality of wireless routers 300 based on the acquired wireless router information and server registration information. In this regard, when failing in access to the server 400 through the first wireless router 310, the controller 1800 may notify the mobile terminal 200 about the failure, and the mobile terminal 200 may generate registration auxiliary information (e.g., a QR code) to select a second wireless router 320. Accordingly, the controller 1800 may select the second wireless router 320 based on wireless router information on the second wireless router 320. The controller 1800 may also select the second wireless router 320 based on the wireless router information on the second wireless router 320 and server registration information based thereon.

The controller 1800 may perform control to transmit device registration information including identification information thereof (the home appliance 1000) to the server 400 through the wireless router 300. Here, the identification information thereof may include an identifier (ID) of the home appliance 1000 (e.g., a robot cleaner).

The controller 1800 may transmit the device registration information and the server registration information to the server 400 through the wireless router 300. In detail, the controller 1800 may acquire the server registration information through the detected registration auxiliary information. The controller 1800 may acquire the security authentication information through the detected registration auxiliary information. The controller 1800 may transmit the device registration information and the security authentication information through the selected wireless router, and may perform security authentication using the security authentication information during a process of registering the home appliance 1000 using the device registration information.

Hereinafter, a method of generating registration auxiliary information (e.g., a QR code) by the mobile terminal 200 will be described. In this regard, referring to FIG. 6, the mobile terminal 200 may include an input unit 210, a wireless communication unit 220, a controller 230, and an output unit 240.

The input unit 210 may receive an identity (ID) and a password (PW) from a user through an application (App). The input unit 210 may be embodied on a display to receive touch input from the user.

The wireless communication unit 220 may be configured to transmit or receive information to and from the server 400. The wireless communication unit 220 may include a first wireless communication unit 221 configured to transmit or receive information to and from the server 400 through the wireless router 300 and a second wireless communication unit 221 configured to directly transmit or receive information to and from the server 400 without using the wireless router 300. In this case, wireless interfaces with the server 400 through the first wireless communication unit 221 and the second wireless communication unit 221 may be referred to as a first wireless interface and a second wireless interface, respectively. For example, the first wireless interface may be embodied through a WiFi service, and the second wireless interface may be embodied through a mobile communication service.

The controller 230 may select the wireless router 300 (e.g., the first wireless router 310) to be wirelessly connected to the home appliance 1000 (e.g., a robot cleaner) among the plurality of wireless routers 300.

For example, the controller 230 may select the first wireless router 310 that is optimal to transmit information to the server 400 by the home appliance 1000 (e.g., a robot cleaner). The controller 230 may select the first wireless router 310 with the best signal characteristic among wireless routers that the home appliance 1000 (e.g., a robot cleaner) is capable of accessing among the plurality of wireless routers 300. In this case, the signal characteristic may be any one of a signal size of a signal from the wireless routers 300, a signal-noise ratio (SNR), a signal-interference ratio (SIR), and a channel occupation state by other terminals.

In another example, when the mobile terminal 200 and the home appliance 1000 (e.g., a robot cleaner) have different positions, the controller 230 may select the first wireless router 310 in consideration of the position of the home appliance 1000 (e.g., a robot cleaner). For example, when the mobile terminal 200 and the home appliance 1000 (e.g., a robot cleaner) are positioned in different rooms, the controller 230 may select the first wireless router 310 adjacent to the room in which the home appliance 1000 (e.g., a robot cleaner) is positioned.

In another example, the controller 230 may select any one of the plurality of wireless routers 300 based on information input by the user, through an application. The user may select the first wireless router 310 on a screen on which an image for wireless router selection is displayed on the application.

The controller 230 may select the auxiliary information (e.g., a QR code) including wireless router information for identifying the selected wireless router and the server registration information. In this regard, the wireless router information and the server registration information, which are selected by the controller 230, may be transmitted to the home appliance 1000 (e.g., a robot cleaner) through the auxiliary information (e.g., a QR code) and may also be transmitted to the server 400. That is, the wireless router information and the server registration information may be transmitted to the server 400 through the selected wireless router (e.g., the first wireless router 310) using the first wireless interface in the wireless communication unit 220 (e.g., the first wireless communication unit 221).

Accordingly, the server 400 may pre-establish communication connection through the first wireless router 310. The server 400 may pre-inform the first wireless router 310 that the home appliance 1000 (e.g., a robot cleaner) is to be wirelessly connected thereto. Accordingly, the first wireless router 310 may limit channel occupation by other mobile terminals for more stable wireless connection of the home appliance 1000 (e.g., a robot cleaner).

In order to enhance the reliability of information on the selected wireless router, the wireless router information and the server registration information may be transmitted to the server 400 through a different wireless interface. For example, the wireless router information and the server registration information may be transmitted directly to the server 400 without using any one of the plurality of wireless routers 300 using a different second wireless interface from the first wireless interface in the wireless communication unit 220 (e.g., the second wireless communication unit 222).

The wireless communication unit 220 may receive a confirmation message from the server 400. When the wireless router information transmitted to the server 440 through the first wireless interface is the same as the wireless router information transmitted to the server 440 through the second wireless interface, the wireless communication unit 220 may receive the confirmation message from the server 400.

When the wireless communication unit 220 receives the confirmation message, the controller 230 may generate a message indicating that the auxiliary information (e.g., a QR code) is to be recognized through the camera 1900 of the home appliance 1000 (e.g., a robot cleaner). The controller 230 may display the generated message on a screen of the mobile terminal 200, corresponding to the output unit 240, through an application so as to allow the user to easily view the message. As such, the user may enable the home appliance 1000 (e.g., a robot cleaner) to identify the auxiliary information (e.g., a QR code) through the camera 1900.

After device registration information including the identification information of the home appliance 1000 (e.g., a robot cleaner) is registered in the server 400 through the selected wireless router (e.g., the first wireless router 310), a registration completion message may be transmitted. In this regard, the registration completion message may be a message indicating that the home appliance 1000 (e.g., a robot cleaner) is completely registered. For example, the registration completion message may be transmitted to at least one of the mobile terminal 200 or the home appliance 1000 (e.g., a robot cleaner) from the server 400.

In this regard, the wireless communication unit 220 may receive the registration completion message from the server 400 through a wireless router (e.g., the first wireless router 310) using the first wireless interface. In this regard, the registration completion message may be directly received by the wireless communication unit 220 from the server 400 using the second wireless interface without using any one of a plurality of wireless routers. In this case, the second wireless interface may be different form the first wireless interface, and for example, may be a wireless interface using a mobile communication network.

The registration completion message may be transmitted to the home appliance 1000 (e.g., a robot cleaner).

When the home appliance 1000 is the mobile robot 100, the following embodiment may be embodied. In order to easily detect the auxiliary information (e.g., a QR code) by the camera 1900 of the mobile robot 100, the mobile robot 100 may further use the driver 1300 and the sensing unit 1400. In this regard, referring to FIGS. 1 and 4, the driver 1300 may be configured to move the body 110. In more detail, the driver 1300 may move the body 110 in forward and backward directions or may move the body 110 clockwise or counterclockwise in place to change a position or direction of the camera 1900.

The sensing unit 1400 may be configured to detect an orientation angle of a screen of the mobile terminal 200 positioned adjacent to the camera 1900. In this regard, the controller 1800 may control at least one of the driver 1300 or the camera 1900 based on the orientation angle of the screen, detected from the sensing unit 1400. In this case, the controller 1800 may control at least one of the driver 1300 or the camera 1900 by further using information on an object recognized in an image captured by the camera 1900.

When the auxiliary information (e.g., a QR code) is not detected by the camera 1900, the controller 1800 of the mobile robot 100 may rotate the body 110 by a first angle through the driver 1300 based on the orientation angle of the screen, detected from the sensing unit 1400. Accordingly, the controller 1800 may control the camera 1900 to re-detect a QR code from the mobile terminal 200 at the rotated first angle.

When the camera 1900 does not detect the auxiliary information (e.g., a QR code) even after the body 110 is rotated by the first angle through the driver 1300 of the mobile robot 100, the controller 1800 may perform the following operation. The controller 1800 of the mobile robot 100 may rotate the camera 1900 by a second angle through the driver 1300. Accordingly, the controller 1800 may control the camera 1900 to re-detect the auxiliary information (e.g., a QR code) the mobile terminal 200 at the rotated second angle.

Figure 7:
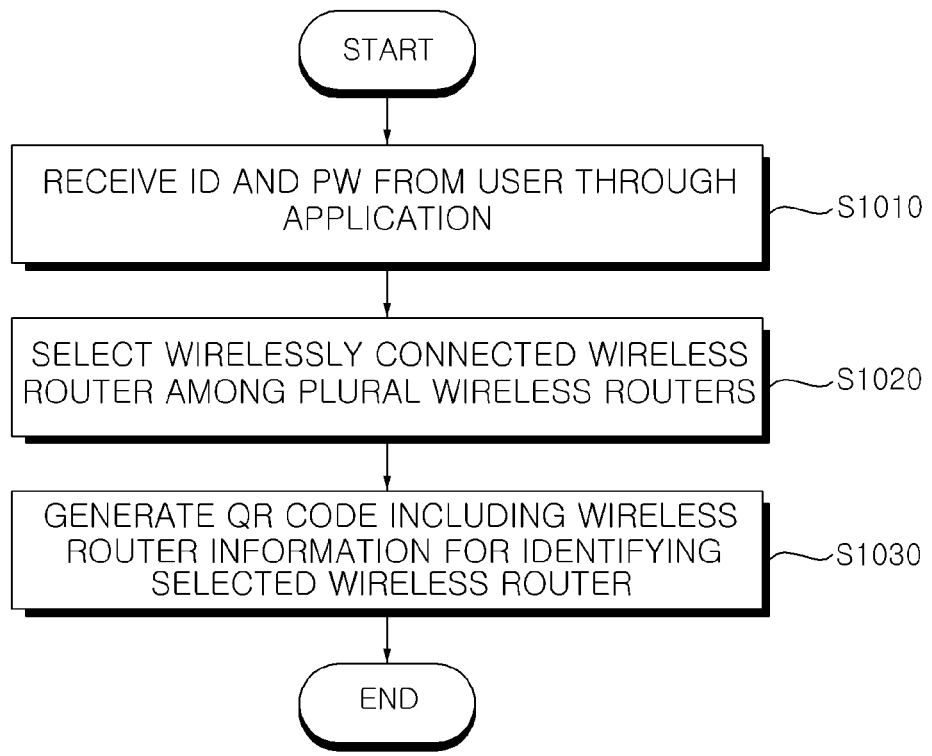
FIG. 7 is a flowchart showing a method performed by a mobile terminal with regard to a method of registering information on a home appliance in a server.

With reference to FIG. 7, a method of registering information on the home appliance 1000 (e.g., a robot cleaner) in the server 400 by the mobile terminal 200 will be described.

First, the mobile terminal 200 may receive an identity (ID) and a password (PW) from a user through an application (S1010).

The wireless router (e.g., the first wireless router 310) to be wirelessly connected to the cleaner may be selected among the plurality of wireless routers 300 (S1020).

Then, the controller 230 may generate the auxiliary information (e.g., a QR code) including wireless router information for identifying the selected wireless router (S1030). In this case, the auxiliary information (e.g., a QR code) may further include server registration information required to register information on the home appliance 1000 (e.g., a robot cleaner) other than the wireless router information as described above.

Figure 8:
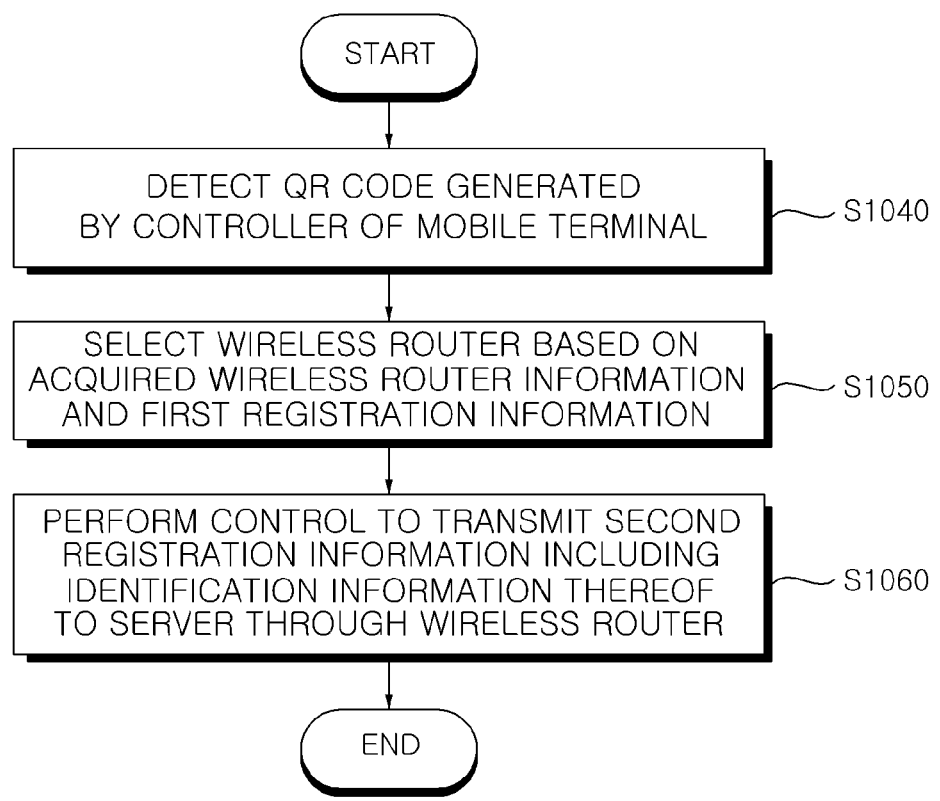
FIG. 8 is a flowchart showing a method performed by a home appliance with regard to a method of registering information on a home appliance in a server.

With reference to FIG. 8, a method of registering information on a robot cleaner in the server 400 by the home appliance 1000 (e.g., a robot cleaner) will be described.

The controller 1800 may detect the auxiliary information (e.g., a QR code) generated by the controller 230 of the mobile terminal 200 (S1040). Accordingly, information on a wireless router that is to be wirelessly connected to the wireless communication unit 1100 and server registration information required for registration in the server may be acquired through the auxiliary information (e.g., a QR code). In this regard, when the sensing unit 1400 determines that a screen of the mobile terminal 200 is adjacent to the camera 1900, the camera 1900 may be driven.

Then, the controller 1800 may select a wireless router (e.g., the first wireless router 310) based on the wireless router information (S1050). Here, the controller 1800 may select a wireless router based on wireless router information only, but the wireless router may also be selected based on the wireless router information and the server registration information (S1050).

Then, the controller 1800 may perform control to transmit device registration information including identification information thereof to the server 400 through the wireless router (e.g., the first wireless router 310) (S1060). In this case, the controller 1800 may perform control to transmit the device registration information and the acquired server registration information to the server 400 through the wireless router. Here, the server registration information transmitted to the server 400 may include the security authentication information.

Hereinafter, a method (hereinafter referred to as a 'control method') of registering information of the home appliance 1000 according to an embodiment will be described with reference to FIGS. 7 to 20.

The control method may be performed by the mobile terminal 200, the home appliance 1000, the wireless router 300, and the server 400. While the control method is performed, a user may intervene in simple login, password input, selection and input of a home appliance, selection and input of a wireless router, and the like, which connect operations to each other. The present invention may relate to a computer program for embodying each operation of the control method or may relate to a recording medium having recorded thereon a program for executing the control method. The 'recoding medium' may refer to a computer readable recording medium. The present invention may relate to a control system including both hardware and software. The application 500 stated in the description may be executed by the mobile terminal 200.

In some embodiments, functions stated in operations may be performed differently from an order. For example, two operations that are successively illustrated may be substantially simultaneously performed or the operations may be frequently performed in reverse order according to a corresponding function.

Figure 9:
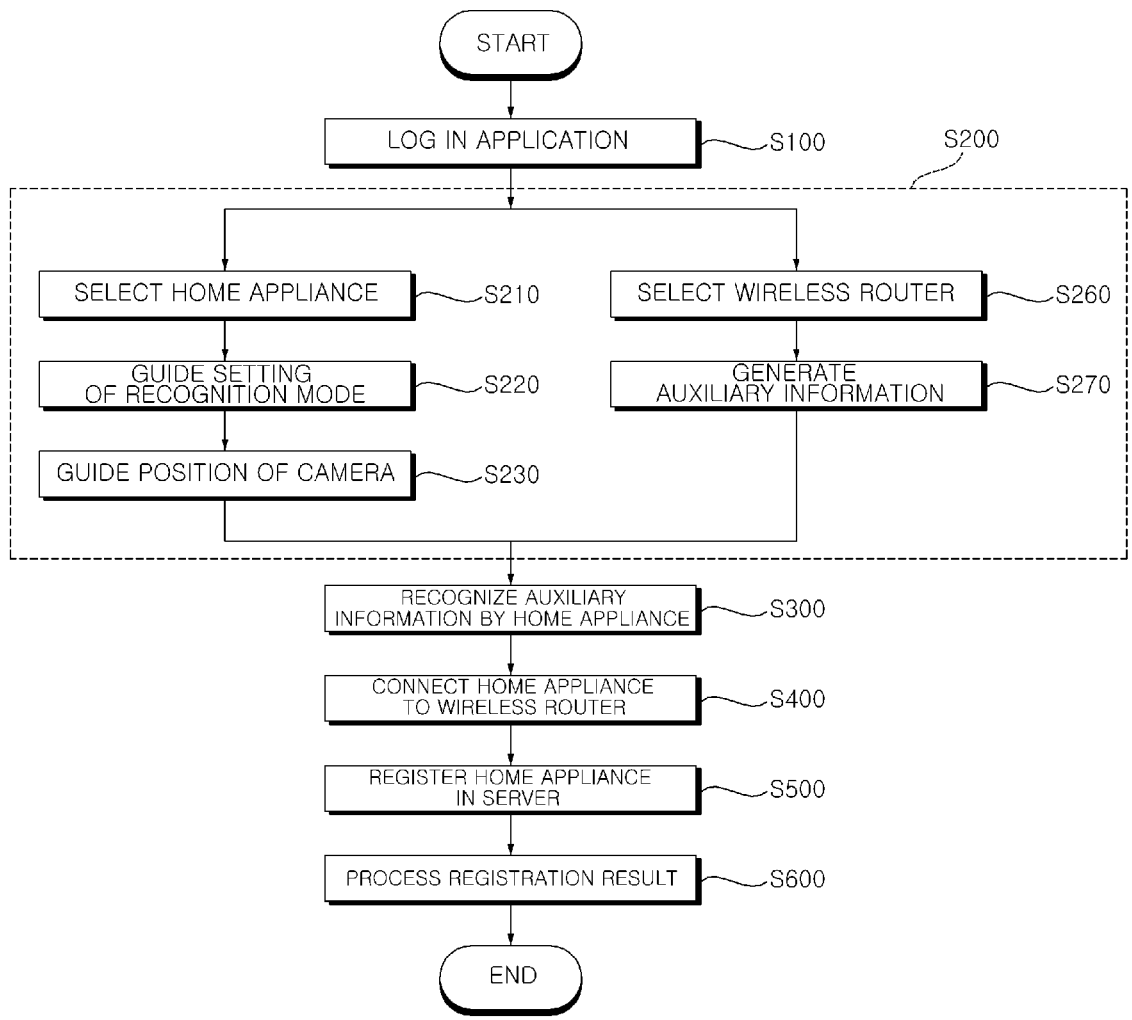
FIG. 9 is a flowchart of a method of registration information on a home appliance according to an embodiment.

Referring to FIG. 9, the control method may include logging in the application 500 (S100). The control method may include a preparation operation S200 in which the mobile terminal 200 generates the registration auxiliary Information. The control method may include an auxiliary information recognition operation S300 in which a camera of the home appliance 1000 detects the registration auxiliary information after the preparation operation S200. The control method may include a wireless router connection operation S400 in which the home appliance 1000 selects a wireless router based on information acquired through the registration auxiliary information after the auxiliary information recognition operation S300. In the wireless router connection operation S400, the home appliance 1000 may be wirelessly connected to the selected wireless router. The control method may include a server registration operation S500 in which the home appliance 1000 transmits device registration information including identification information thereof to the server 400 through the selected wireless router after the wireless router connection operation S400. The control method may include a registration result processing operation S600 in which the server 400 transmits a registration result of the home appliance 1000 to the home appliance 1000 and the mobile terminal 200 after the server registration operation S500.

The preparation operation S200, the auxiliary information recognition operation S300, the wireless router connection operation S400, and the server registration operation S500 may be referred to as operations (a), (b), (c), and (d), respectively.

Referring to FIG. 9, the preparation operation S200 may include a home appliance selection operation S210 in which the home appliance 1000 as a registration target is selected through the mobile terminal 200. The home appliance selection operation S210 may be performed prior to the auxiliary information recognition operation S300. The preparation operation S200 may include a recognition mode setting guidance operation S220 in which the mobile terminal 200 outputs information for guiding recognition mode conversion of the home appliance 1000 selected in the home appliance selection operation S210. The recognition mode setting guidance operation S220 may be performed prior to the auxiliary information recognition operation S300 after the home appliance selection operation S210. The preparation operation S200 may include a camera position guidance operation S230 in which the mobile terminal 200 guides a position of a camera of the selected home appliance 1000. The camera position guidance operation S230 may be performed prior to the auxiliary information recognition operation S300 after the home appliance selection operation S210. According to the present embodiment, the camera position guidance operation S230 is performed after the recognition mode setting guidance operation S220, but in another example, the recognition mode setting guidance operation S220 may be performed after the camera position guidance operation S230, and in another example, the camera position guidance operation S230 and the recognition mode setting guidance operation S220 may also be simultaneously performed.

Referring to FIG. 9, the preparation operation S200 may include a wireless router selection operation S260 of selecting a wireless router to be wirelessly connected to the home appliance 1000 through the mobile terminal 200. The wireless router selection operation S260 may be performed before the registration auxiliary information is generated. The preparation operation S200 may include an auxiliary information generation operation S270 of generating the registration auxiliary information based on information of the wireless router selected in the wireless router selection operation. Any one of the wireless router selection operation S260 and the home appliance selection operation S210 may be performed and then the other one may be performed, or the wireless router selection operation S260 and the home appliance selection operation S210 may be simultaneously performed. According to the present embodiment, after the home appliance selection operation S210 is performed, the wireless router selection operation S260 may be performed.

Figure 10:
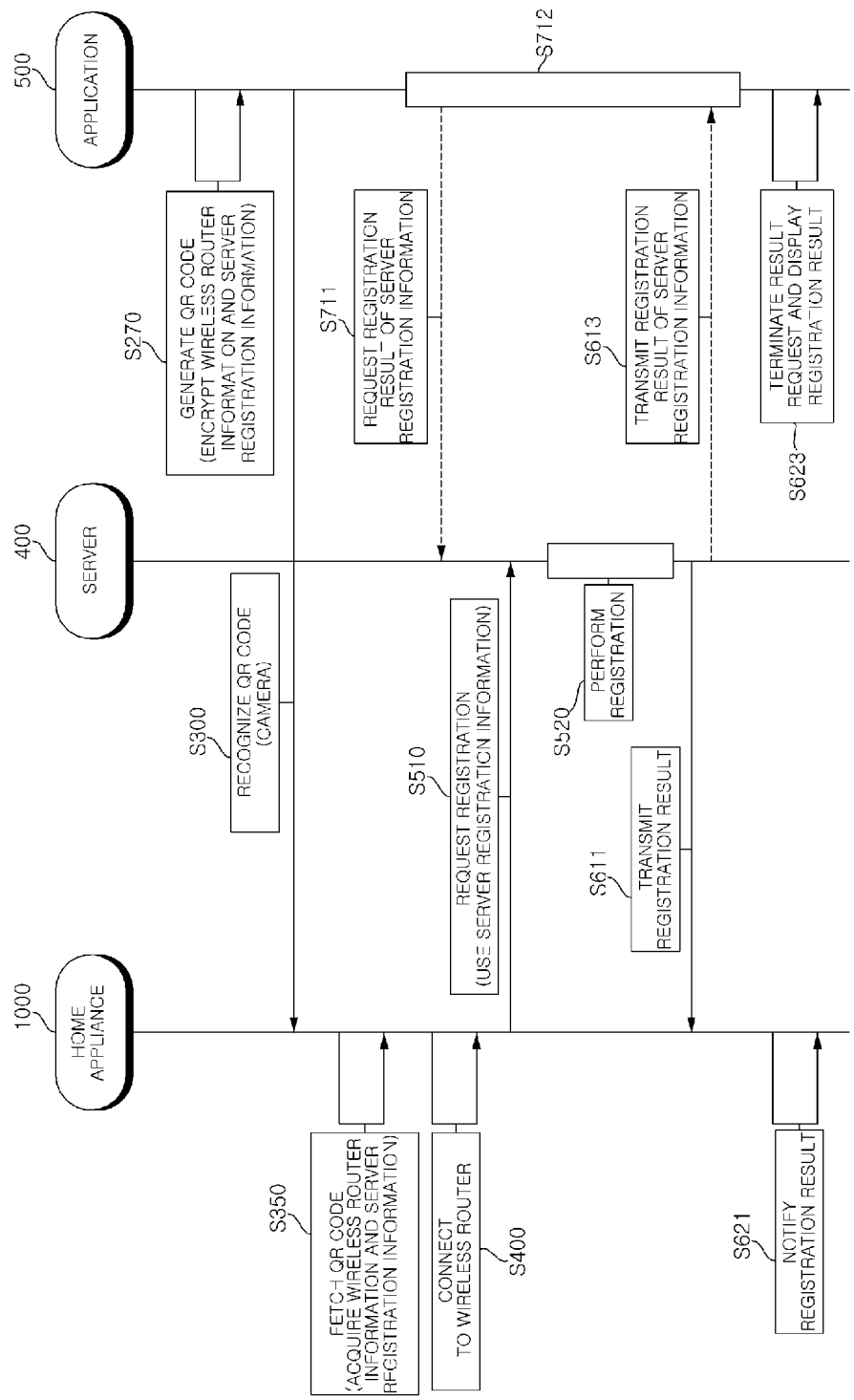
FIG. 10 is a conceptual diagram showing the method of FIG. 9 based on a processing operation of the home appliance 1000, the server 400, and the application 500 and a mutual communication procedure and is illustrated downwards from the above in a time sequence.

Referring to FIG. 10, the control method may further include registration result request operations S711 and S712 in which the mobile terminal 200 makes a request to the server 400 for a result (a registration result) of whether the home appliance 1000 is registered.

Hereinafter, the operations will be described in detail.

In the login operation S100, a user may input an ID for identifying a user and a PW and may log in the application 500 through the mobile terminal 200.

Figure 13:
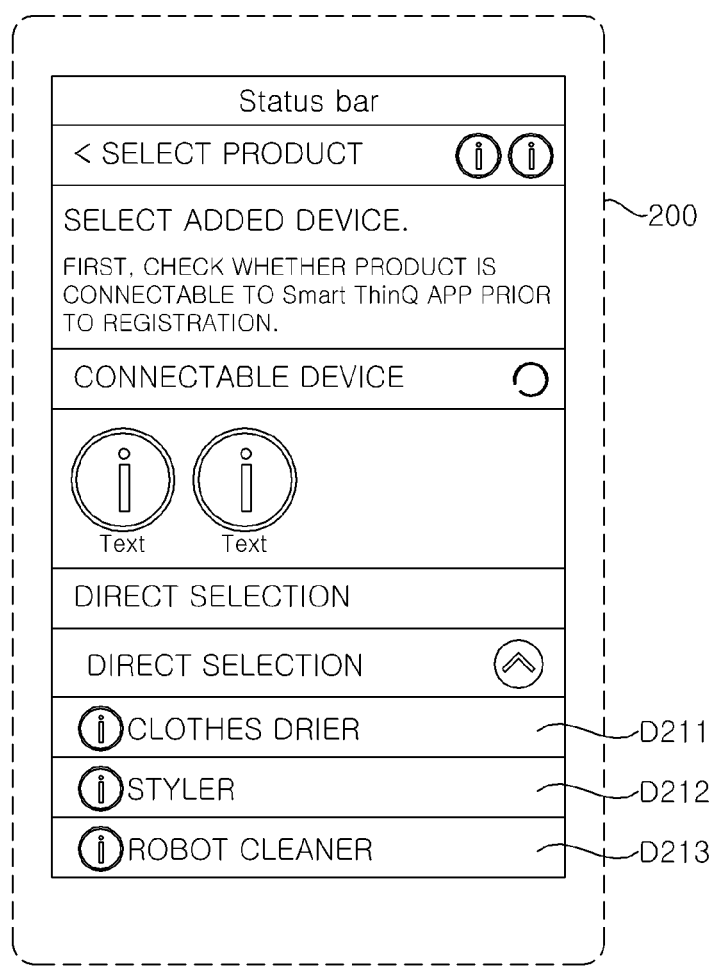
FIGS. 13 to 20 illustrate examples of context displayed on a screen of the mobile terminal 200 of an application for performing the method of FIG. 9.

Referring to FIG. 13, in the home appliance selection operation S210, a registrable home appliance may be displayed on a screen of the mobile terminal 200. A plurality of registrable home appliances D211, D212, and D213 may be displayed on a screen of the mobile terminal 200. The user may touch the screen of the mobile terminal 200 and may select a home appliance that is a registration target. For example, the user may select and input the home appliance D213 through the application 500. For reference, the registrable home appliance may include a cleaner (a robot cleaner or the like), a refrigerator, a display device (a TV), a clothing treatment apparatus (a washing machine, a clothes drier, a refresher, or the like), an air conditioning machine (an air conditioner or the like), a heating apparatus (a boiler or the like), or the like.

Figure 14:
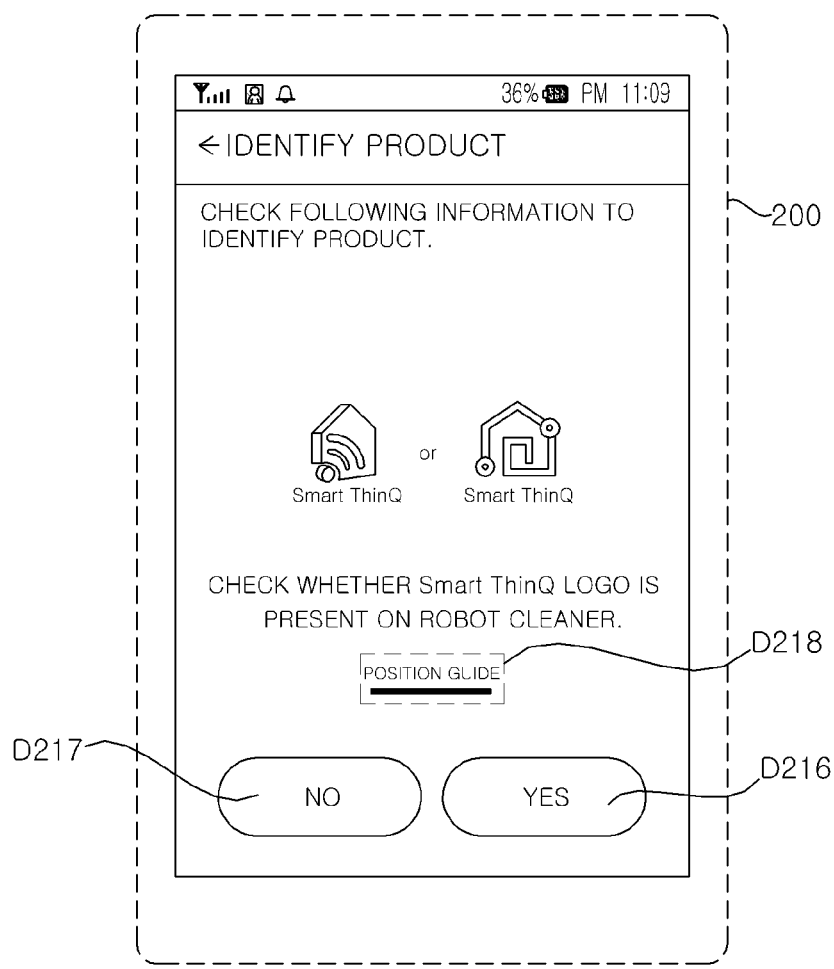

Referring to FIG. 14, in the home appliance selection operation S210, when a home appliance is selected, a message for making a request for checking whether the selected home appliance is a registrable home appliance may be output (S215). Operation S215 may be performed prior to the auxiliary information recognition operation S300 after the home appliance selection operation S210. In operation S215, the mobile terminal 200 may output a message for guiding a method of checking the selected home appliance is a registrable home appliance. For example, the mobile terminal 200 may display a predetermined design that is illustrated only on the registrable home appliance and may display a message for making a request for checking whether the corresponding design is illustrated on an actual home appliance corresponding to the selected home appliance. In FIG. 14, a message for making a request for checking whether a predetermined logo (e.g., TinQ logo) is present on the selected actual home appliance may be output. The user may select position guide D218 of the application 500, and a portion of the selected home appliance with the predetermined design being illustrated, which is requested to be checked by the application 500, may be guided to the user. The user may select an affirmation unit D216 to inform the application 500 that the selected actual home appliance is a registrable home appliance. The user may select a disaffirmation unit D217 to inform the application 500 that the selected actual home appliance is not a registrable home appliance. User selection on the position guide D218, the affirmation unit D216, and the disaffirmation unit D217 may be performed by touching a corresponding portion on a screen of the mobile terminal 200 by a user.

Figure 15:
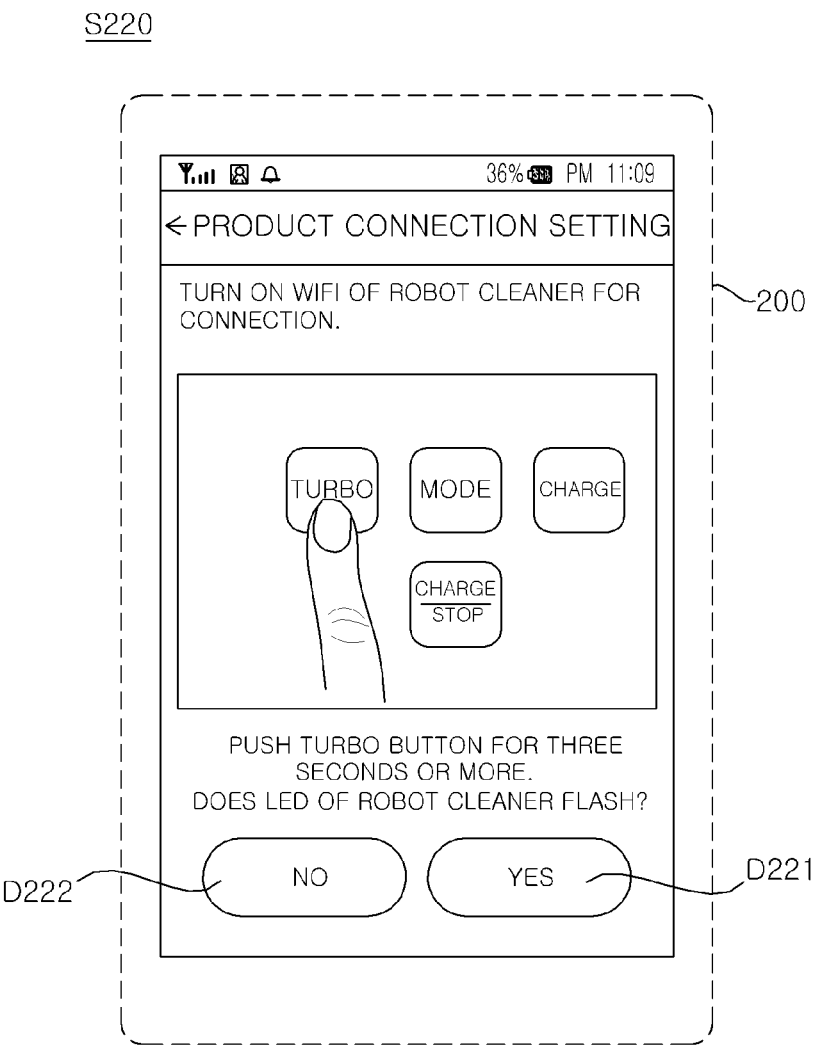
Figure 16:
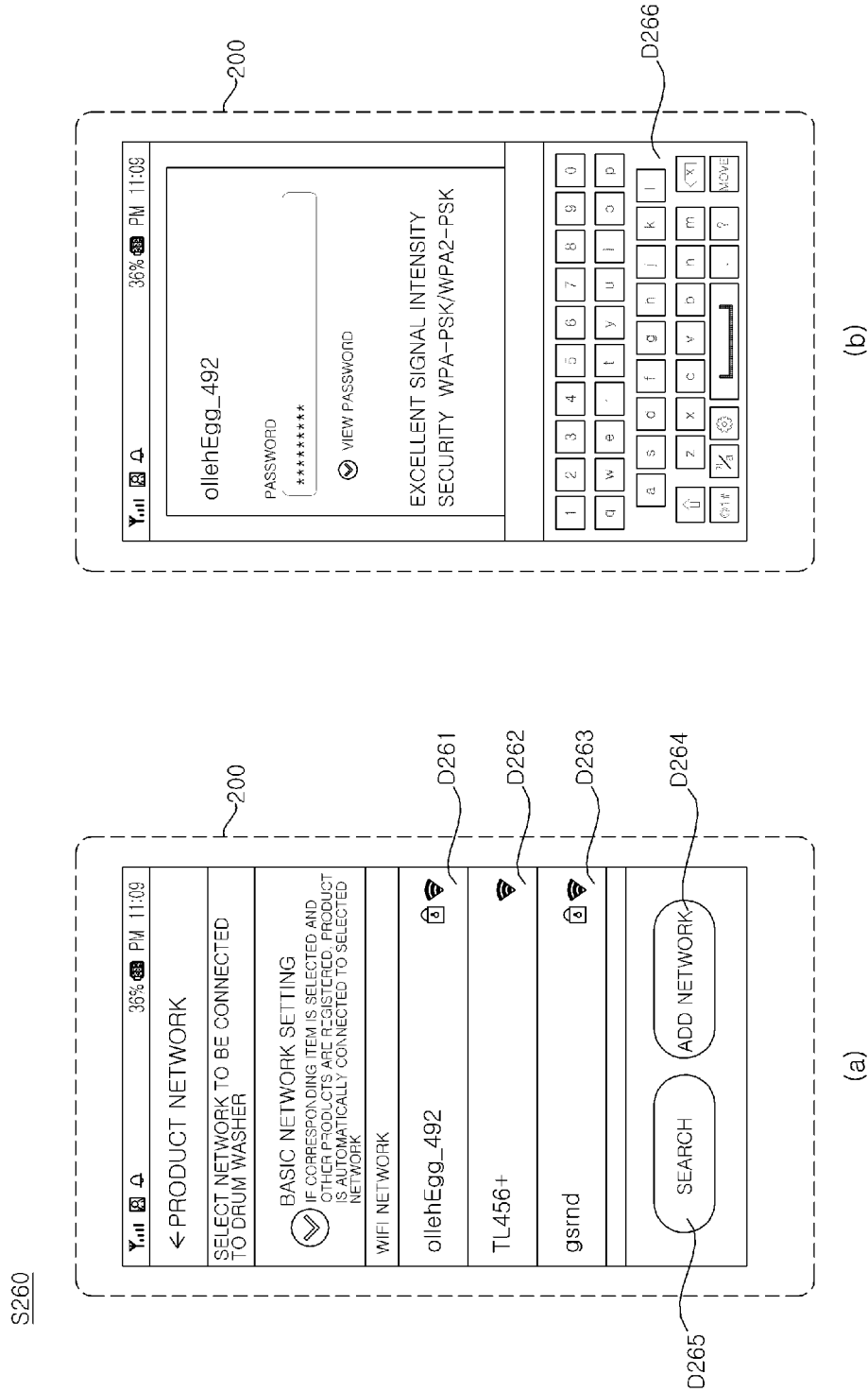

Referring to FIG. 15, in the recognition mode setting guidance operation S220, the mobile terminal 200 may output information for guiding recognition mode activation of the selected home appliance 1000. For example, the mobile terminal 200 may output a message and a picture/image for guiding recognition mode conversion of the selected home appliance 1000. An input unit such as a button of the home appliance 1000 or an input unit such as a button of a remote controller for remote control of the corresponding home appliance 1000 may be configured to convert the home appliance 1000 into a recognition mode. For example, FIG. 15 illustrates an example in which guidance messages of 'Push the turbo button for three seconds or more.' and 'Does LED of the robot cleaner flash?' are displayed on a screen of the mobile terminal 200. The user may manipulate a home appliance or a remote controller according to the guided information home appliance to convert the home appliance 1000 to the recognition mode.

Figure 12:
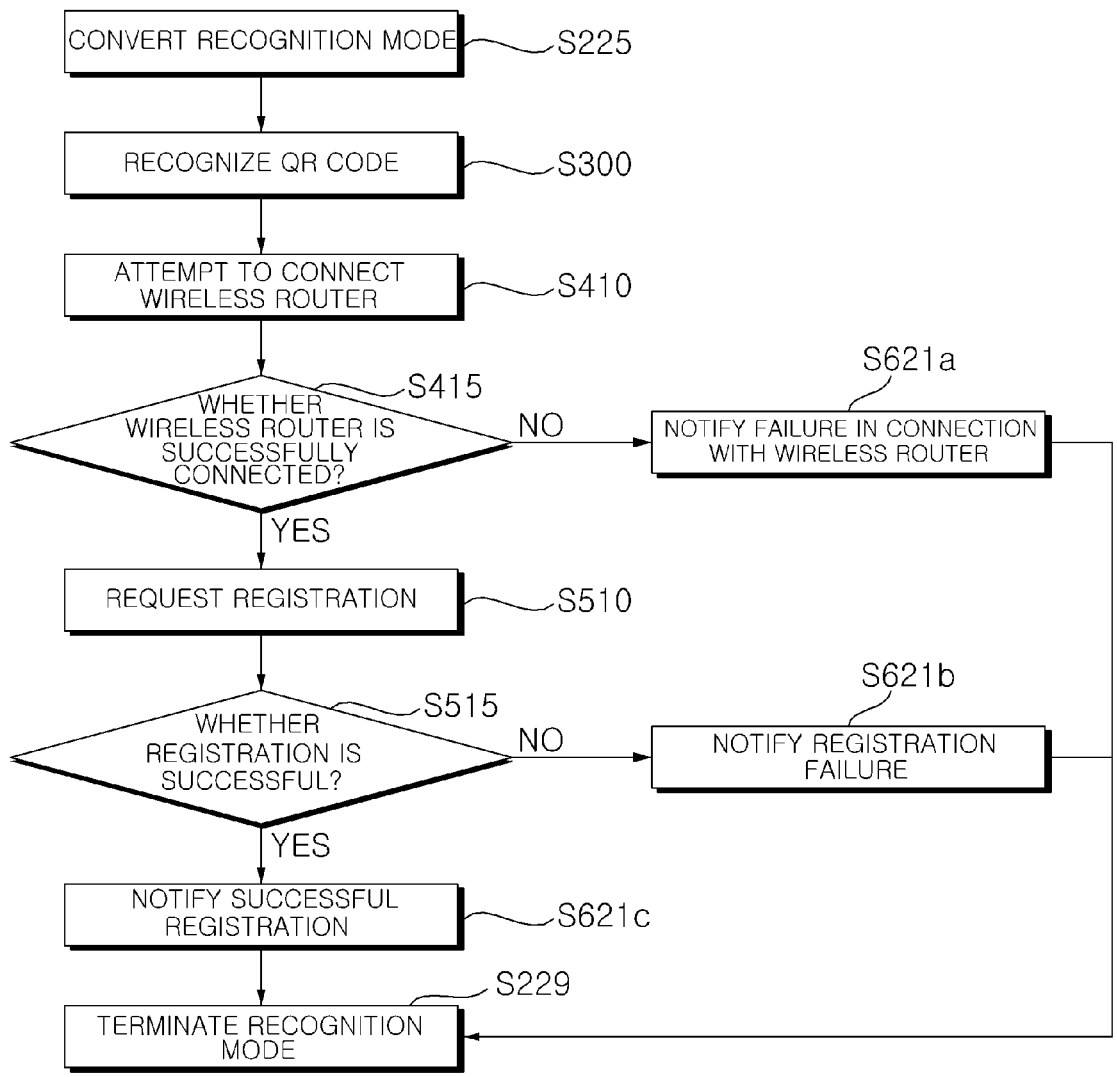
FIG. 12 is a flowchart of the method of FIG. 9 from a viewpoint of a home appliance mainly.

Referring to FIG. 12, in a state in which the home appliance 1000 is converted to the recognition mode (S225), the home appliance 1000 may recognize the QR code through the camera 1900 (S300). In a state in which the home appliance 1000 is completely converted to the recognition mode (S225), the home appliance 1000 may acoustically or visually output information indicating that a current state is a recognition mode state. For example, the home appliance 1000 may output predetermined sound in the recognition mode state or may be preset to periodically and repeatedly turn on and off a predetermined LED.

Referring back to FIG. 15, the user may select an affirmation unit D221 to inform the application 500 that the selected home appliance is completely converted to the recognition mode. The user may select a disaffirmation unit D222 and may inform the application 500 that the selected home appliance is not converted to the recognition mode. User selection of the affirmation unit D221 and the disaffirmation unit D222 may be performed by touching a corresponding portion on a screen of the mobile terminal 200 by a user.

Referring to FIG. 16A, in the wireless router selection operation S260, a connectable wireless router may be displayed on the screen of the mobile terminal 200. A plurality of connectable wireless routers D261, D262, and D263 may be displayed on the screen of the mobile terminal 200. The user may touch the screen of the mobile terminal 200 to select a wireless router as a connection target of the home appliance 1000. For example, the user may select and input the wireless router D261 through the application 500. As such, in the wireless router connection operation S400 to be performed later, the home appliance 1000 may attempt to wireless connection with the wireless router selected in the wireless router selection operation S260.

Referring to FIG. 16A, the user may input various settings with respect to a network. The user may select an input unit D264 for adding a network to further display another wireless router on the screen of the mobile terminal 200. The user may select a search unit D265 to allow the mobile terminal 200 to search for an additional wireless router.

Referring to FIG. 16B, when one wireless router is selected in the wireless router selection operation S260, an image for inputting a password of the selected wireless router may be displayed on the mobile terminal 200 in order to check access authority with respect to the selected wireless router. The user may input a password through an input unit D266, and the application 500 may use the selected wireless router using the password input by the user.

Figure 17:
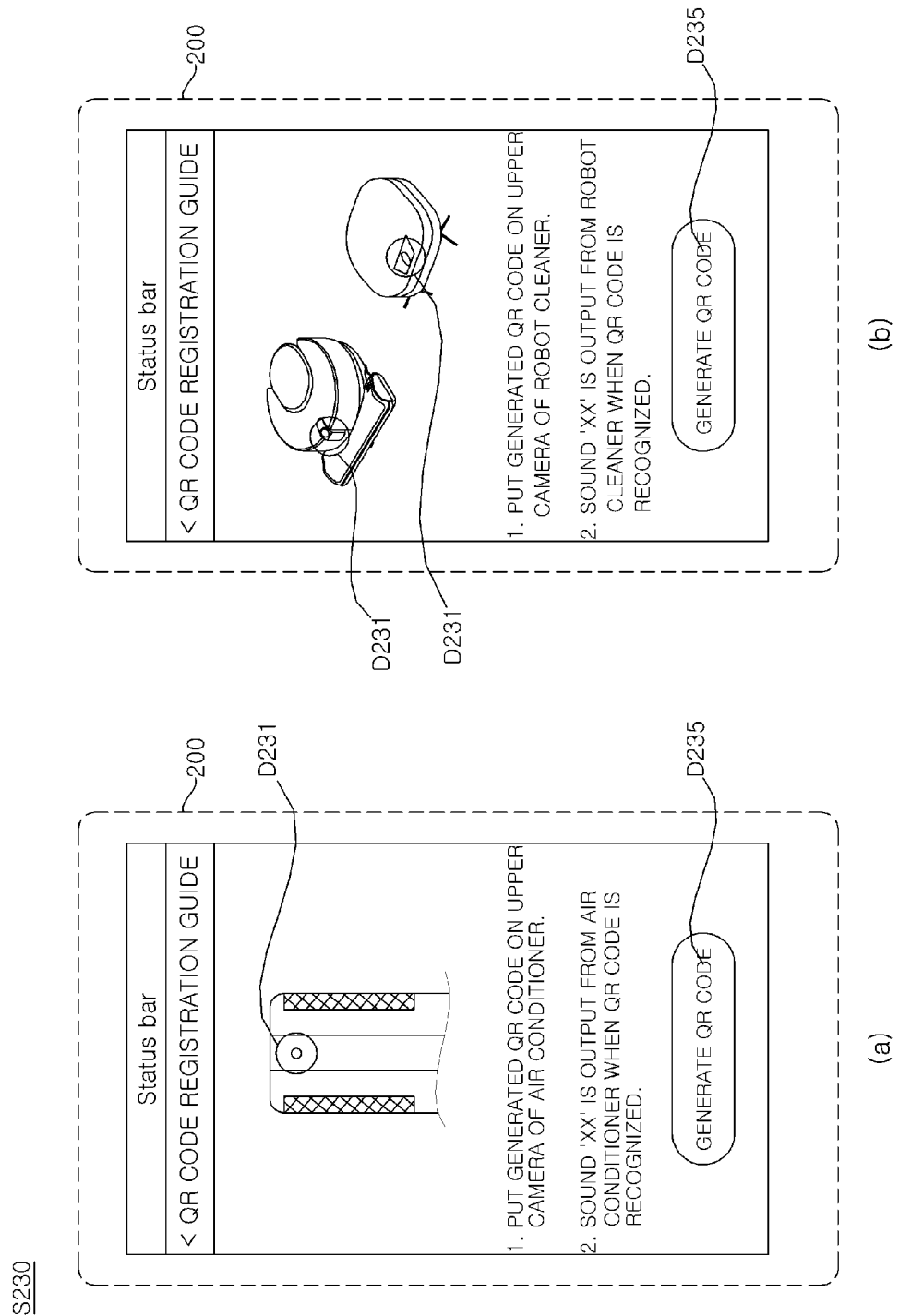

Referring to FIG. 17, in the camera position guidance operation S230, the mobile terminal 200 may output information for guiding a position of a camera of the selected home appliance 1000. For example, the mobile terminal 200 may output a message and a picture/image for guiding a position of the camera of the selected home appliance 1000. For example, FIG. 17 illustrates an example in which guidance messages of 'Put the generated QR code on the upper camera of OOO' and 'Sound XX is output from the robot cleaner when the QR code is recognized' are displayed on a screen. FIG. 17A illustrates an example of the camera position guidance operation S230 when an air conditioner is selected in the home appliance selection operation S210. FIG. 17B illustrates an example of the camera position guidance operation S230 when a robot cleaner is selected in the home appliance selection operation S210. The mobile terminal 200 may display a picture of the selected home appliance and a position of a camera of the home appliance (D231).

Referring to FIG. 17, the mobile terminal 200 may display a generation input unit D235 for beginning of generation of the registration auxiliary information. The user may select the generation input unit D235 through a touch or the like to begin to perform the auxiliary information generation operation S270.

In the auxiliary information generation operation S270, the application 500 may generate the registration auxiliary information. The registration auxiliary information may include the wireless router information. The registration auxiliary information may further include the server registration information.

In the auxiliary information generation operation S270, the application 500 may generate the registration auxiliary information based on wireless router information on the selected wireless router. The application 500 may generate registration auxiliary information based on the wireless router information and the server registration information. The application 500 may encrypt predetermined information items (e.g., the wireless router information and the server registration information) to generate the registration auxiliary information.

Figure 18:
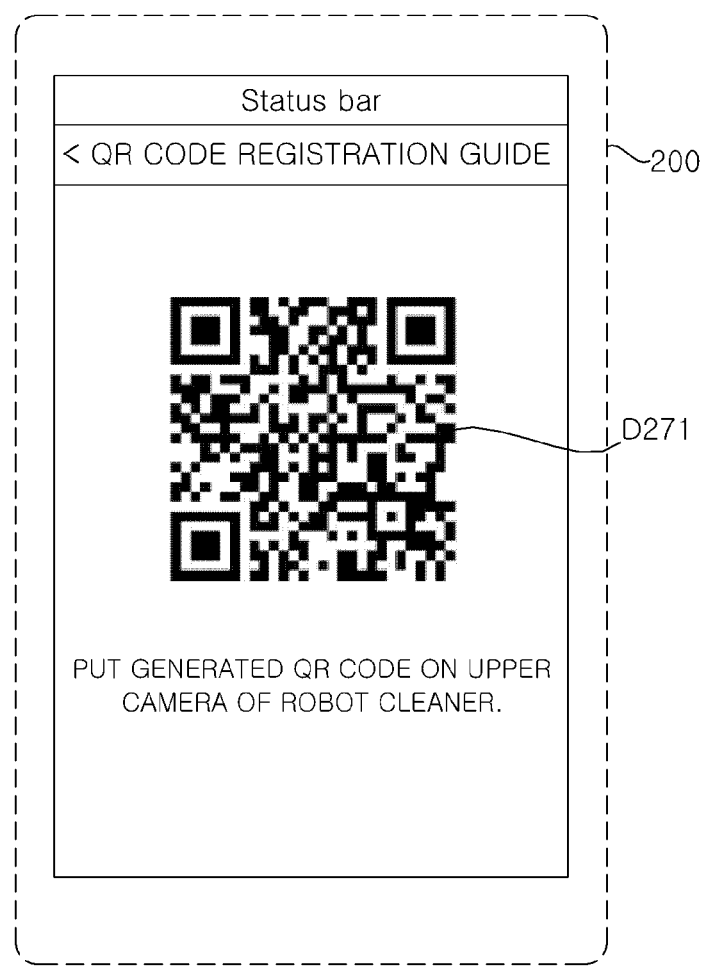

In the auxiliary information generation operation S270, the application 500 may generate a QR code. Referring to FIG. 18, the auxiliary information generation operation S270 may include a recognition request operation S271 of displaying the QR code on the screen of the mobile terminal 200. In the recognition request operation S271, a message for making a request for recognition of the registration auxiliary information using a camera may be output.

In the auxiliary information recognition operation S300, the camera of the home appliance 1000 may recognize the registration auxiliary information. The user may move the registration auxiliary information displayed by the mobile terminal 200 to a front side of the camera of the home appliance 1000 and may enable the camera to detect the registration auxiliary information. In the auxiliary information recognition operation S300, the home appliance 1000 may detect the registration auxiliary information and may fetch the encrypted wireless router information. In the auxiliary information recognition operation S300, the home appliance 1000 may detect the registration auxiliary information and may fetch the encrypted server registration information. In the auxiliary information recognition operation S300, the home appliance 1000 may acquire the wireless router information and the server registration information. In the auxiliary information recognition operation S300, the home appliance 1000 may acquire the security authentication information.

Figure 19:

Referring to FIG. 19, in the auxiliary information recognition operation S300, the camera of the home appliance 1000 may recognize the registration auxiliary information, and then a standby operation S750 may be performed until whether information on the home appliance 1000 is registered in the server 400 is determined. In the standby operation S750, information indicating that the home appliance 1000 is currently connected to the server 400 may be output to the screen of the mobile terminal 200.

After the auxiliary information recognition operation S300, the wireless router connection operation S400 may be performed. In the wireless router connection operation S400, the home appliance 1000 may acquire information on a wireless router to be wirelessly connected to the home appliance 1000 through the registration auxiliary information. In the wireless router connection operation S400, the home appliance 1000 may select a wireless router based on the acquired wireless router information.

Referring to FIG. 12, the wireless router connection operation S400 may include a connection attempt operation S410 in which the home appliance 1000 attempts wireless connection with the selected wireless router. Subsequently to the connection attempt operation S410, operation S410 of determining whether the home appliance 1000 is successfully connected to the wireless router may be performed. In operation S415, when it is determines that connection fails, information indicating that connection of the wireless router fails may be output (S621a). For example, in operation S415, when it is determined that connection fails, the home appliance 1000 may output voice indicating that connection fails (S621a). In operation S415, when it is determined that connection is successful, operation S510 of making a request for registration of information on the home appliance 1000 through the connected wireless router may be performed. Subsequently to the registration request operation S510, operation S515 of determining whether the information on the home appliance 1000 is successfully registered in the server 400 may be performed. In operation S515, when it is determined that registration fails, information indicating that registration of the information on the home appliance 1000 fails may be output (S621b). For example, in operation S515, when it is determined that registration fails, the home appliance 1000 may output voice indicating that registration fails (S621b). In operation S515, when it is determined that registration is successful, information indicating that the information on the home appliance 1000 is successfully registered may be output (S621c). For example, in operation S515, when it is determined that registration is successful, the home appliance 1000 may output voice indicating that registration is successful (S621c). In another example, in the notification operations S621a, S621b, and S621c, the mobile terminal 200 may also output the corresponding notification.

The method may include operation S229 of terminating the recognition mode by the home appliance 1000 after the auxiliary information recognition operation S300. According to the present embodiment, after the notification operations S621a, S621b, and S621c, the recognition mode termination operation S229 may be performed.

The home appliance 1000 may further acquire the server registration information through the detected registration auxiliary information. The server registration information may include the security authentication information.

Figure 11:
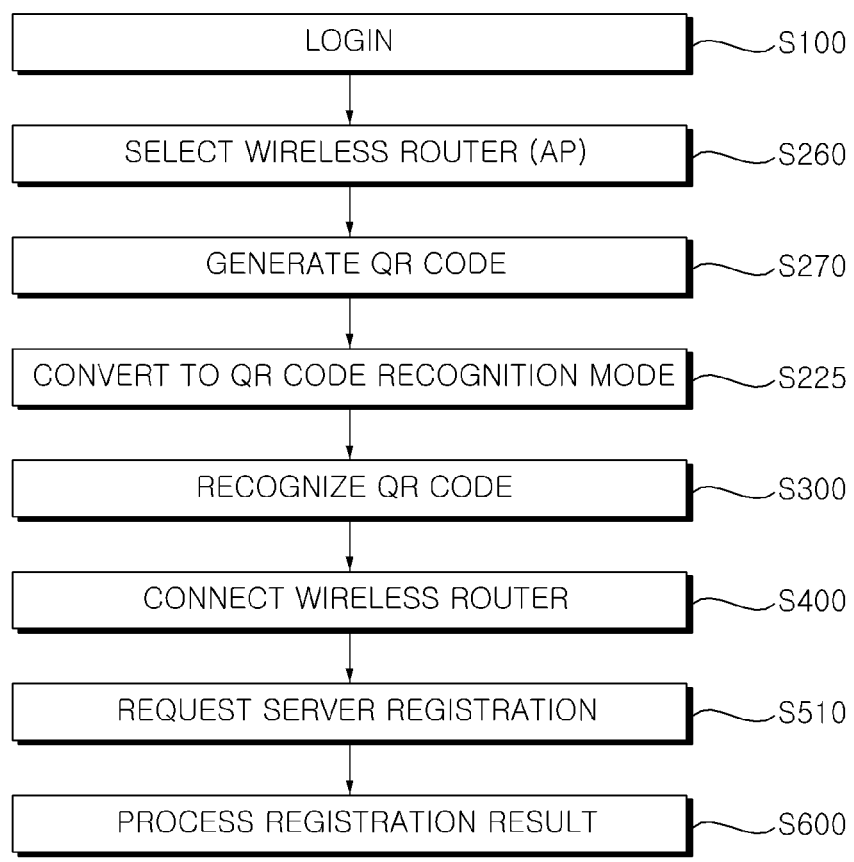
FIG. 11 is a flowchart of the method of FIG. 9 from a user viewpoint mainly.

Referring to FIGS. 10 and 11, the server registration operation S500 may include operation S510 in which the home appliance 1000 makes a request for registration of information in the server 400 through a wireless router. In the server registration operation S500, the home appliance 1000 may transmit the device registration information and the server registration information to the server 400 through the wireless router. The server 400 may permit a process of registration of information, based on the server registration information received through the wireless router. For example, in the server registration operation S500, the home appliance 1000 may transmit the security authentication information to the server through the wireless router, and the server 400 may perform security authentication for performing the information registration process of the home appliance 1000 based on the received security authentication information. The server 400 may register the information on the home appliance 1000 based on the received device registration information (S520). The server registration operation S500 may include operation S515 of determining whether the information on the home appliance 1000 is successfully registered (refer to FIG. 12).

Referring to FIGS. 10 and 11, in the registration result processing operation S600, the server 400 may transmit the information registration result of the home appliance 1000 to the home appliance 1000 (S611). In the registration result processing operation S600, the server 400 may transmit the information registration result of the home appliance 1000 to the mobile terminal 200 (S613). That is, in operation S613, the information registration result of the home appliance 1000 may be transmitted to the application 500 from the server 400.

In the registration result processing operation S600, the home appliance 1000 that receives the information registration result may output the registration result (S621). When registration fails, the home appliance 1000 may perform the notification operation S621b, and when registration is successful, the home appliance 1000 may perform the notification operation S621c. Here, after the home appliance 1000 makes a request for registration in the server through the wireless router (S510), if information is not registered within a predetermined time (timeout), it may be determined that registration fails.

Figure 20:
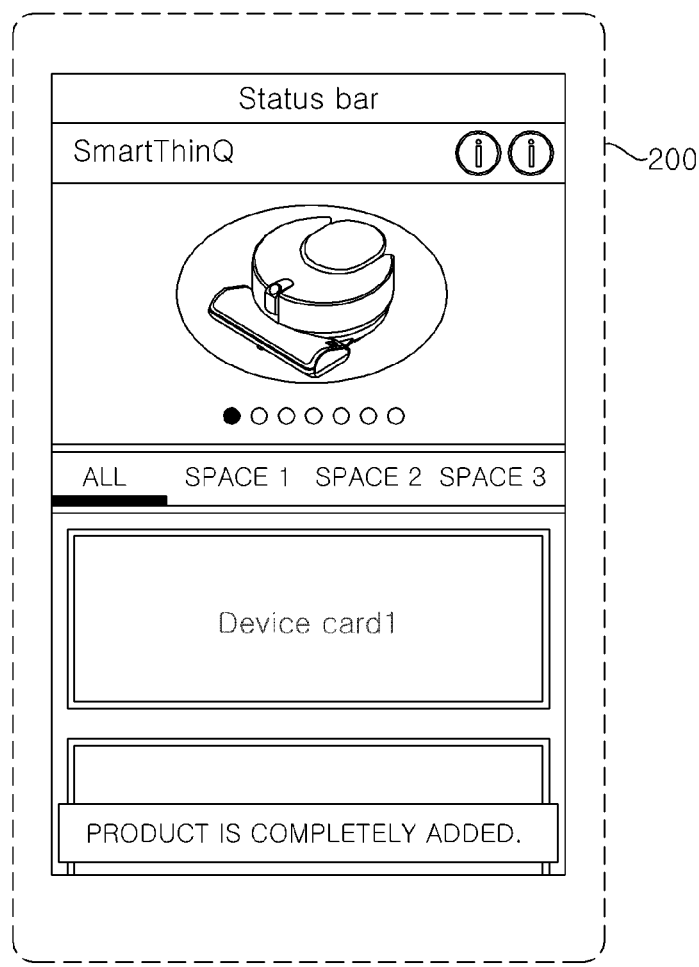

Referring to FIGS. 10 and 20, in the registration result processing operation S600, the mobile terminal 200 that receives the information registration result may display the registration result (S623). When registration is successful, the successfully registered information of the home appliance 1000 may be displayed on the screen of the mobile terminal 200 (S623). The successfully registered information of the home appliance 1000 may be displayed on the screen of the mobile terminal 200 according to necessity of the user without a further separate registration procedure.

With reference to FIG. 10, a process performed between the home appliance 1000, the server 400, and the application 500 will be described below. The application 500 may encrypt the server registration information and the wireless router information selected in the wireless router selection operation S260 to generate a QR code (S270). The home appliance 1000 may detect the generated QR code using a camera (S300). The home appliance 1000 may perform operation S350 of fetching the detected QR code. The home appliance 1000 may acquire the wireless router information and the server registration information in operation S350. The home appliance 1000 may perform operation S400 of wireless connection with the wireless router selected based on the acquired wireless router information. After the home appliance 1000 is connected to the wireless router 300, the home appliance 1000 may make a request for registration of the home appliance 1000 in the server 400 through the connected wireless router (S510). In the registration request operation S510, the home appliance 1000 may transmit the acquired server registration information to the server 400 through the wireless router. The server 400 may perform security authentication through the received server registration information. In the registration request operation S510, the home appliance 1000 may transmit the device registration information to the server 400 through the wireless router. The server 400 may perform registration using the received device registration information (S520)

Referring to FIG. 10, in order for the server 400 to transmit the registration result of the home appliance 1000 to the mobile terminal 200, the registration result request operations S711 and S712 in which the mobile terminal 200 makes a request to the server 400 for the registration result may be performed. In the registration result request operations S711 and S712, the mobile terminal 200 may make a request to the server 400 for the registration result of the server registration information (e.g., an access token). Accordingly, the server 400 may match the server registration information received from the home appliance 1000 through the wireless router with the server registration information received from the mobile terminal 200 and may transmit the registration result requested by the mobile terminal 200 to the mobile terminal 200.

The registration result request operations S711 and S712 may be performed after the preparation operation S200. The registration result request operations S711 and S712 may be performed after the registration auxiliary information is generated.

The registration result request operations S711 and S712 may include a first operation S711 in which the mobile terminal 200 makes a request to the server for the registration result. Operation S711 may be performed after the registration auxiliary information is generated.

Operation S711 may be performed before or after the wireless router connection operation S400.

The registration result request operations S711 and S712 may include operation S712 in which the mobile terminal 200 periodically makes a request for registration in the server 400 after operation S711. Operation S712 may be performed until the server 400 transmits a registration result to the mobile terminal 200. Operation S712 may be terminated when a predetermined time elapses even if the server 400 does not transmit the registration result to the mobile terminal 200. In the registration result request operations S711 and S712, the mobile terminal 200 may perform the standby operation S750.

Upon receiving wrong information in response to the request for the registration result from the server 400, the mobile terminal 200 may determine that registration fails. When the mobile terminal 200 does not receive the registration result information in response to the request for the registration result from the server 400 within a predetermined time, the mobile terminal 200 may determine that registration fails.

Referring to FIG. 10, after the registering operation S520, the server 400 may forward (transmit) the registration result to the home appliance 1000 through the wireless router (S611). After the registering operation S520 is performed, the server 400 may forward (transmit) the registration result to the mobile terminal 200 (S613). In operation S613, the server 400 may transmit the registration result of the server registration information to the mobile terminal 200.

Referring to FIG. 10, the home appliance 1000 may receive the registration result and may perform the notification operation S621 of the registration result. The mobile terminal 200 may receive the registration result and may perform operation S623 of terminating the registration result request and displaying the registration result.

The information of the wireless router and the server registration information may be transmitted to the server 400 from the mobile terminal 200 through the selected wireless router using the first wireless interface.

The wireless router information and the server registration information may be transmitted directly to the server 400 from the mobile terminal 200 without using the wireless router using the different second wireless interface from the first wireless interface. When the wireless router information transmitted through the first wireless interface is the same as the wireless router information transmitted through the second wireless interface, the server 400 may transmit the confirmation message to the mobile terminal 200.

When receiving the confirmation message, the mobile terminal 200 may generate and output a message indicating that the registration auxiliary information is recognized through the camera. Then, the auxiliary information recognition operation S300 may be performed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A home appliance for information registration, comprising:
    a body;
    a wireless communication unit configured to be connected to a wireless router using a wireless communication method and configured to transmit information;
    a camera attached to the body and configured to detect registration auxiliary information generated by a mobile terminal;
    a controller configured to perform control to select the wireless router based on information acquired through the registration auxiliary information and to transmit device registration information including identification information thereof to a server through the selected wireless router;
    a sensing unit configured to detect an orientation angle of a screen of the mobile terminal positioned adjacent to the camera; and
    a driver configured to move the body,
    wherein, when the camera does not detect the registration auxiliary information, the controller rotates the body by a first angle through the driver based on an orientation angle of the screen, detected from the sensing unit, and controls the camera to re-detect the registration auxiliary information from the mobile terminal at the rotated first angle.

2. The home appliance of claim 1, wherein the controller acquires information on the wireless router to be wirelessly connected to the wireless communication unit through the registration auxiliary information, and selects the wireless router based on the wireless router information.

3. The home appliance of claim 1, wherein the registration auxiliary information includes a quick response (QR) code.

4. The home appliance of claim 1, wherein, when the camera does not detect the registration auxiliary information after the body is rotated by the first angle, the controller rotates the camera by a second angle through the driver and controls the camera to re-detect the registration auxiliary information from the mobile terminal at the rotated second angle.

5. A cleaner for information registration, comprising:
    a body;
    a wireless communication unit configured to be connected to a wireless router using a wireless communication method and configured to transmit information;
    a camera attached to the body and configured to detect registration auxiliary information generated by a mobile terminal;
    a controller configured to perform control to select the wireless router based on information acquired through the registration auxiliary information and to transmit device registration information including identification information thereof to a server through the selected wireless router;
    a sensing unit configured to detect an orientation angle of a screen of the mobile terminal positioned adjacent to the camera; and
    a driver configured to move the body,
    wherein, when the camera does not detect the registration auxiliary information, the controller rotates the body by a first angle through the driver based on an orientation angle of the screen, detected from the sensing unit, and controls the camera to re-detect the registration auxiliary information from the mobile terminal at the rotated first angle.

6. A method of registering information of a home appliance, the method comprising:
    operation (a) in which a mobile terminal generates registration auxiliary information;
    operation (b) in which a camera attached to a body of the home appliance detects the registration auxiliary information;
    operation (c) in which the home appliance selects a wireless router based on information acquired through the registration auxiliary information and is wirelessly connected to the selected wireless router; and
    operation (d) in which the home appliance transmits device registration information including identification information thereof to a server through the selected wireless router,
    wherein
    a sensing unit is configured to detect an orientation angle of a screen of the mobile terminal positioned adjacent to the camera; and
    a driver is configured to move the body,
    and when the camera does not detect the registration auxiliary information, the home appliance rotates the body by a first angle through the driver based on an orientation angle of the screen, detected from the sensing unit, and controls the camera to re-detect the registration auxiliary information from the mobile terminal at the rotated first angle in operation (b).

7. The method of claim 6, wherein operation (c) includes acquiring information on the wireless router to be wirelessly connected to the home appliance through the registration auxiliary information and selecting the wireless router based on the wireless router information, by the home appliance.

8. The method of claim 7, wherein the home appliance further acquires server registration information required for registration in the server through the registration auxiliary information.

9. The method of claim 8, wherein the server registration information includes security authentication information; and
    wherein operation (d) includes transmitting the device registration information and the server registration information to the server through the wireless router, by the home appliance.

10. The method of claim 6, wherein the registration auxiliary information includes information on the wireless router to be wirelessly connected to the home appliance and server registration information required for registration in the server through the registration auxiliary information.

11. The method of claim 10, further comprising, after operation (a), performing a registration result request operation of making a request to the server for a registration result by the mobile terminal to enable the server to transmit the registration result of the home appliance to the mobile terminal.

12. The method of claim 11, wherein the home appliance acquires the wireless router information and the server registration information through the registration auxiliary information;
  wherein operation (c) includes selecting the wireless router based on the wireless router information by the home appliance;
  wherein operation (d) includes transmitting the device registration information and the server registration information to the server through the wireless router by the home appliance; and
  wherein the registration result request operation includes making a request to the server for the registration result of the server registration information by the mobile terminal.

13. The method of claim 6, further comprising a registration result processing operation in which the server transmits a registration result of the home appliance to the home appliance and the mobile terminal.

14. The method of claim 6, further comprising, prior to operation (b), performing a home appliance selection operation of selecting a home appliance as a registration target through the mobile terminal.

15. The method of claim 14, further comprising, prior to operation (b) after the home appliances selection operation, outputting information for guiding a position of a camera of the selected home appliance by the mobile terminal.

16. The method of claim 14, further comprising, prior to operation (b) after the home appliance selection operation, outputting information for guiding recognition mode conversion of the selected home appliance by the mobile terminal.

17. The method of claim 6, wherein operation (a) includes selecting a wireless router to be wirelessly connected to the home appliance through the mobile terminal before the registration auxiliary information is generated.

18. The method of claim 17, wherein operation (a) includes generating the registration auxiliary information based on information of the wireless router selected in operation (a).

19. The method of claim 17, wherein wireless router information of the wireless router selected in operation (a) and server registration information required for registration in the server are transmitted to the server through the selected wireless router using a first wireless interface by the mobile terminal;
  wherein the wireless router information and the server registration information are transmitted directly to the server without using the wireless router as a medium using a different second wireless interface from the first wireless interface by the mobile terminal; and
  wherein, when the wireless router information transmitted through the first wireless interface is the same as the wireless router information transmitted through the second wireless interface, the server transmits a confirmation message to the mobile terminal.

* * * * *